United States Patent
Auvray et al.

(10) Patent No.: US 6,563,875 B2
(45) Date of Patent: May 13, 2003

(54) ADAPTIVE METHOD OF ENCODING AND DECODING A SERIES OF PICTURES BY TRANSFORMATION, AND DEVICES FOR IMPLEMENTING THIS METHOD

(75) Inventors: Eric Auvray, Orvault (FR); Claude Perron, Rennes (FR); Alain Ferre, Cesson Sevigne (FR)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/978,376

(22) Filed: Oct. 17, 2001

(65) Prior Publication Data

US 2002/0039387 A1 Apr. 4, 2002

Related U.S. Application Data

(63) Continuation of application No. 07/408,515, filed as application No. PCT/FR88/00649 on Nov. 30, 1995.

(30) Foreign Application Priority Data

Dec. 30, 1987 (FR) .............................................. 87 18371

(51) Int. Cl.[7] .................................................. H04N 7/12
(52) U.S. Cl. ............................. 375/240.13; 375/240.12; 375/240.02
(58) Field of Search ...................... 375/240.02, 240.12, 375/240.13, 240.14, 240.15, 240.16, 240.18, 240.19, 240.2, 240.24; 382/238, 236, 248, 250, 251; 386/111; 348/400.1, 403.1, 404.1, 420.1, 406.1

(56) References Cited

U.S. PATENT DOCUMENTS

| | | | |
|---|---|---|---|
| 3,761,613 A | 9/1973 | Limb | .......................... 178/7.1 |
| 4,196,448 A | 4/1980 | Whitehouse et al. | ....... 358/135 |

(List continued on next page.)

FOREIGN PATENT DOCUMENTS

| | | | |
|---|---|---|---|
| EP | 0 084 270 A3 | 7/1983 | ............. H04N/7/12 |
| EP | 0 189 703 A1 | 8/1986 | .......... H04N/7/133 |
| FR | 2 589 020 | 4/1987 | ............. H03M/7/40 |
| JP | 62-272632 | 11/1987 | ............. H04L/1/00 |

OTHER PUBLICATIONS

Bauch et al., "Picture Coding", IEEE Trans. on Communications, vol. 22, iss. 0096–2244, Sep. 1974, pp. 1158–1167.*

Lukas et al., "DPCM Quantization of Color Television Signals", IEEE Trans. on Communications, vol. 31, Iss. 0096–2244, Jul. 1983, pp. 927–932.*

H. Bacchi et al., "Real–Time Orthogonal Transformation Of Colour–Television Pictures", Philips Technical Review, vol. 38, No. 4/5, 1978/1979, pp. 119–129.

A. G. Tescher, "Adaptive Transform Coding of Color Images At Low Rates", National Telecommunications Conference, Houston, Nov. 30—Dec. 4, 1980, vol. 2, pp. 36.3.1—36.3.4, IEEE, New York.

* cited by examiner

Primary Examiner—Vu Le
(74) Attorney, Agent, or Firm—Joseph S. Tripoli; Joseph J. Laks; Frank Y. Liao

(57) ABSTRACT

A method and a device for coding and decoding a sequence of images or pictures is disclosed. One exemplary embodiment disclosed codes by dividing each picture into blocks of picture elements. Each element of a block being represented by a digital value. Two types of coding are utilized in order to reduce the amount of data; inter-coding, which takes into account a corresponding block in a previous picture and intra coding, which is independent from a previous picture. Blocks being thus coded so that a further reduction of data is obtained by transmitting high spatial frequencies with less weight than low spatial frequencies. This is accomplished with the use of weighting coefficients. Weighting coefficients are variable as a function of the quantity of information to be transmitted.

3 Claims, 8 Drawing Sheets

U.S. PATENT DOCUMENTS

| | | | |
|---|---|---|---|
| 4,217,609 A | 8/1980 | Hatori et al. | 358/136 |
| 4,245,248 A | 1/1981 | Netravali et al. | 358/136 |
| 4,394,774 A | 7/1983 | Widergren et al. | 382/56 |
| 4,447,886 A | 5/1984 | Meeker | 364/725 |
| 4,541,012 A | 9/1985 | Tescher | 358/133 |
| 4,581,638 A | 4/1986 | Chiariglione et al. | 358/135 |
| 4,583,114 A | 4/1986 | Catros | 358/13 |
| 4,672,427 A | 6/1987 | Rzeszewski | 358/13 |
| 4,672,441 A | 6/1987 | Hoelzlwimmer et al. | 358/135 |
| 4,707,738 A | 11/1987 | Ferre et al. | 358/135 |
| 4,764,805 A * | 8/1988 | Rabbani et al. | 348/396 |
| 4,772,956 A * | 9/1988 | Roche et al. | 358/433 |
| 4,774,574 A * | 9/1988 | Daly et al. | 348/406 |
| 4,780,761 A * | 10/1988 | Daly et al. | 348/408 |
| 4,797,742 A * | 1/1989 | Sugiyama et al. | 375/240.02 |
| 4,839,724 A * | 6/1989 | Keesen et al. | 375/240.12 |
| 4,894,713 A * | 1/1990 | Delogne et al. | 348/403 |
| 4,920,414 A * | 4/1990 | Remus et al. | 348/406 |
| 4,922,544 A * | 5/1990 | Stansfield et al. | 382/166 |
| 4,969,055 A | 11/1990 | Oberjatzas et al. | 360/32 |
| 4,974,078 A * | 11/1990 | Tsai | 348/408 |
| 5,055,927 A * | 10/1991 | Keesen et al. | 348/389 |

ADAPTIVE METHOD OF ENCODING AND DECODING A SERIES OF PICTURES BY TRANSFORMATION, AND DEVICES FOR IMPLEMENTING THIS METHOD

CROSS REFERENCE TO RELATED APPLICATIONS

This is a continuation of application Ser. No. 07/408,515, filed Nov. 30, 1995 claiming the benefit and priority of PCT International Application No. PCT/FR88/00649, filed Dec. 30, 1988, and French Application No. 87 18371, filed Dec. 30, 1987.

The invention relates to an adaptive method of encoding and decoding a series of pictures by transformation, and devices for implementing this method. The object of such a method is to reduce the quantity of information to be transmitted, or to be stored, when pictures have been digitized. It is applicable, for example, to digital video transmission systems or to digital video recorders.

It is known to encode a digitized picture by using a two-dimensional transformation of the cosine or Fourier, or Hadamard, or Haar, or Karhunen-Loeve type. Such an encoding consists in: dividing each picture into blocks of picture elements, each picture element being represented by a digital value which is the value of its brightness or of a color difference: applying the transformation to each block in order to obtain a matrix of values called the transformation coefficients of the block; and in transmitting these transformation coefficients in an encoded form, for example using a Huffmann code. The decoding then consists in: decoding the Huffmann code words in order to obtain the transformation coefficients; then in restoring the digital values representing each picture element by applying, to the transformation coefficients corresponding to a block of picture elements, the two-dimensional transformation which is the inverse of that used for the encoding. The transformations used in practice are transformations for which there exists fast algorithms, for example the cosine transformation.

The French Patent Application 2,575,351 describes an adaptive method of encoding and decoding consisting in:
dividing each picture into blocks of picture elements;
applying the cosine transformation to each block, the latter being represented by a block of brightness values in order to obtain a block of transformation coefficient;
determining, for each block, if it represents a scene with much movement or little movement;
transmitting the value of the transformation coefficients of the block if the latter represents a scene with much movement, or transmitting the differences in the value of these coefficients with respect to the coefficients of the similar block in the previous picture, if the block represents a scene with little movement;
transmitting an information indicating the type of encoding used for each block, these two types of encoding being called respectively intra-picture encoding and inter-picture encoding. The coefficients or differences of coefficients are transmitted in the form of Huffmann code words.

According to this known method, the decoding consists, before applying the inverse transformation, in determining a value of the transformation coefficients of each block representing a scene with little movement, by adding the difference in value of each of its coefficients respectively to the value of the coefficients of the similar block in the previous picture.

According to this known method, the encoding furthermore consists in applying a weighting to the values of the coefficients or to the values of the differences of coefficients, with a greater weight for the coefficients or the differences of coefficients corresponding to the low spatial frequencies of the picture, with respect to the coefficients or to the differences of the coefficients corresponding to the high spatial frequencies of the picture; and in quantifying according to a linear scale the weighted coefficients and differences of coefficients. The quantification step is variable according to the quantity of information to be transmitted. This is equivalent to multiplying all of the coefficients or all the differences of transformation coefficients of a block by a same coefficient called the quantification coefficient which is variable according to the quantity of information to be transmitted for the blocks of picture elements encoded before the block concerned; and in retaining only the whole part of the result of the multiplication.

The information to be transmitted is stored in a buffer memory enabling a transmission at a constant rate. A regulating device supplies a value of the quantification coefficient which continuously diminishes while the buffer memory is filling and which continuously increases while the buffer memory is emptying.

Naturally, the decoding furthermore consists in multiplying each transmitted coefficient value or each transmitted difference of coefficients value, by a coefficient equal to the inverse of the weighting coefficient used for the encoding; and then in multiplying it by a coefficient equal to the inverse of the quantification coefficient used for the encoding.

When a series of pictures represents a scene containing much movement, the quantity of information to be transmitted is high, and consequently the quantification coefficient is small in order to reduce the amplitude of the values of the transformation coefficients or differences of transformation coefficients to be transmitted. Furthermore, the weighting coefficients give greater weight to the transformation coefficients corresponding to the low spatial frequencies of the picture in order to transmit the essential information of the picture while sacrificing less essential information which corresponds to the high spatial frequencies of the picture.

When the series of pictures represents a scene with little movement or a static scene, the encoding of each block is of the inter-picture type in order to exploit the correlation existing between these successive pictures. From one picture to the next, the values of the differences of transformation coefficients of similar blocks have a decreasing amplitude and the quantity of information to be transmitted tends to reduce. The regulation then reacts by increasing the quantification coefficient. On the other hand, the information remaining to be transmitted no longer relates to the low spatial frequencies of the picture as it has been favoured by the weighting and has therefore been transmitted. The information remaining to be transmitted relates only to the high spatial frequencies of the picture and the latter are then transmitted with a large amount of information. After a time interval corresponding to several pictures, the totality of the information representing a static scene is then transmitted and enables the reconstruction of the scene with very good fidelity.

For the encoding and decoding of color television pictures, the previously mentioned document suggests processing in parallel three series of digital values corresponding to a brightness signal and to two color difference signals respectively.

This known method has two disadvantages: the fact of the parallel processing of these three series of digital values leads to the use of three buffer memories which must restore the encoded information with data rates having constant ratios because the transmission channel has a constant data rate. Now, the information data rates corresponding to a brightness signal and to two color difference signals have extremely variable ratios because the saturation of the colors is very variable and can even be zero in the case of pictures containing only whites, greys and blacks. The fact of imposing a constant ratio between these three information data rates leads in practice to uselessly increasing the quantity of information transmitted, or in sacrificing a portion of the information corresponding to color differences, which is harmful to the fidelity of the reproduction.

Another disadvantage results from the regulation used in this method. When, in a same picture, there is a succession of blocks encoded by an inter-picture encoding, the quantity of information to be transmitted being small, the regulation reacts by increasing the quantification coefficient and tends to maintain a filling of the buffer memory. If an isolated block, or several blocks are to then be encoded by an intra-picture encoding, because they correspond to a limited area which is in motion, it is suddenly necessary to transmit large amounts of information. The buffer memory being maintained practically full, the regulation can only react by sacrificing a large portion of the information to be transmitted, i.e. by suddenly reducing the quantification coefficient when the buffer memory approaches saturation. In such a case, the blocks of picture elements encoded by the inter-picture encoding are restored with excellent fidelity while the adjacent blocks, encoded by an intra-picture encoding are restored with mediocre fidelity. The difference in quality is then very noticeable because these two types of blocks are adjacent in the same picture.

The purpose of the invention is to overcome these two disadvantages of the known method. The object of the invention is an adaptive method of encoding consisting in particular in storing in a same buffer memory the information to be transmitted corresponding to the values of brightness and to the values of the two color difference signals, and consisting in using weighting coefficients and identical quantification coefficients, except for the application of a constant, for the transformation coefficients or the differences of transformation coefficients corresponding to these three types of signals.

According to another feature, the method according to the invention consists in using weighting coefficients which, in addition to giving a greater weight to information corresponding to the low spatial frequencies of the picture, are also variable according to the quantity of information to be transmitted, in order to further reduce the weight given to the information corresponding to the high spatial frequencies of the picture when the filling of the buffer memory increases and approaches the maximum.

According to another feature of the method according to the invention, the quantification coefficient is variable as a function of the filling rate of the buffer memory, but with a discontinuity corresponding to a fixed filling threshold, in order to be constant below this filling threshold and in order to increase when the filling rises above this threshold.

According to the invention, an adaptive method of encoding and decoding of a series of pictures by transformation, the encoding consisting in:

dividing each picture into blocks of picture elements, each block being represented by a block of brightness values, a block of blue color difference values and a block of red color difference values;

applying a two-dimensional transformation to each block of values in order to obtain a block of transformation coefficients of the block of values concerned;

transmitting, for each block of values, either the value of transformation coefficients of the block, or the difference in value of these transformation coefficients, with respect to the value of the transformation coefficients of a similar block in the picture preceding the picture being encoded, in order to minimize the quantity of information to be transmitted for the block in question, the encoding being called intra-picture or inter-picture respectively;

furthermore consisting in multiplying the transformation coefficients and the differences of transformation coefficients, before they are transmitted, by a coefficient called the weighting coefficient, favouring the low spatial frequencies of the pictures; and also in multiplying them by a coefficient called the quantification coefficient which is variable as a function of the quantity of information to be transmitted;

the decoding consisting for each block in:

multiplying each transmitted value of transformation coefficient or each transmitted value of transformation coefficient difference, by a coefficient equal to the inverse of the weighting coefficient used for the encoding and by a coefficient equal to the inverse of the quantification coefficient used for the encoding;

adding, to the value of each difference of transformation coefficients, the value of a transformation coefficient, similar to the coefficient in question in a similar block to the block in question and belonging to the picture preceding the picture being decoded;

applying to each transformation coefficient a transformation which is the inverse of the transformation applied for the encoding, in order to obtain a block of values representing a portion of the decoded picture;

is characterized in that it furthermore consists in regulating the data rate of the transmitted information, in storing in a same buffer memory, the information to be transmitted corresponding to the 3 types of blocks of values, and in multiplying the transformation coefficients and the differences of transformation coefficients of the 3 types of blocks by a same variable weighting coefficient and by a same variable quantification coefficient, except for the application of a constant multiplication factor.

The invention will be better understood and other characteristics will appear with the help of the following description and of the accompanying figures in which.

In one example of implementation, the series of pictures is constituted by a series of color television frames, sampled and digitized. Each picture element is represented by a brightness value, a red color difference value and a blue color difference value, each of these values having eight bits. The brightness is sampled at a frequency of 10.125 MHz while each of the color difference signals is sampled at a frequency of 5.0625 HHz. The data rate of the encoded information is constant and in the order to 10 Mbits per second.

Each television picture to be encoded is constituted by two interlaced frames analysed in a conventional way by a television camera. Each frame is encoded separately.

In this example of implementation the transformation used is the cosine transformation. It is applied to blocks of 16×16 brightness values, blocks of 16×8 red color difference values, and blocks of 16×8 blue color difference values. Any other known two-dimensional transformation can be used for the implementation of the method according to the invention. The transformation is applied in parallel to each of these three types of block. For each block of values it supplies a matrix of values called transformation coefficients of the block of values concerned. The block of transformation coefficients has dimensions identical to those of the block to be transformed. The transformation coefficients have real values.

The transformation coefficients of the brightness values f(i,j) are computed according to the formula:

$$F(u, v) = \sum_{i=0}^{15} \sum_{j=0}^{15} f(i, j) \cdot c(u) \cdot c(v) \cdot \cos(2i+1) \cdot u \cdot \frac{\pi}{32} \cdot \cos\frac{2(j+1) \cdot v \cdot \pi}{32} \quad (1)$$

where
$c(u) = 1/\sqrt{2}$ if $u = 0$
$c(u) = 1$ if $u \neq 0$

The transformation coefficients of the color difference values f'(i,j) are computed according to the formula:

$$F'(u, v) = \sum_{i=0}^{15} \sum_{j=0}^{7} f'(i, j) \cdot c(u) \cdot c(v) \cdot \cos(2i+1) \cdot u \cdot \frac{\pi}{32} \cdot \cos\frac{(2j+1) \cdot v \cdot \pi}{16} \quad (2)$$

i and j are respectively the line index and the column index in the block of values to be encoded; u and v are respectively the line and column indices of the transformation coefficients in the block of these coefficients. The transformation coefficient situated in the first column and on the first line is equal to twice the average value of the coefficients of a block of transformation coefficients. It has a value which is always positive. This value must be encoded with the greatest possible accuracy since the slightest error in this transformation coefficient results in a very visible difference between a block of picture elements and the adjacent blocks.

Figure 1:
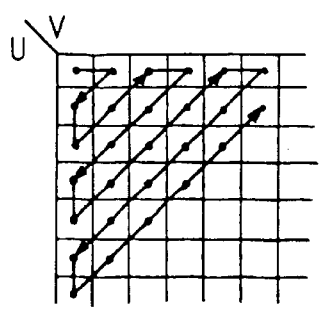
FIG. 1 shows the order of scanning the transformation coefficients or the differences of transformation coefficients of a block of Picture elements, in one example of implementation of the method according to the invention.

The other coefficients of a transformation block correspond to spatial frequencies of the picture which are increasing as u and v increase. For the highest values of u and v, the transformation coefficients are generally zero. In the series, the coefficients of a block of transformation coefficients are considered according to a scanning order which is graphically represented in FIG. 1 and which corresponds to increasing values of the sum $u^2 + V^2$. The scanning path of the transformation coefficients is chosen in such a way as to optimize the compression ratio for the type of picture which is to be encoded, according to their statistical characteristics.

The implementation of the method according to the invention then consists in performing, in parallel, an encoding called the inter-picture encoding and an encoding called the intra-picture encoding for each type of value to be encoded: brightness value, blue color difference value and red color difference value. The inter-picture encoding consists in computing the difference in value between the transformation coefficients of a block of picture elements in question, respectively with regard to the transformation coefficients of a similar block to the block in question in the picture preceding the picture being encoded. The intra-picture encoding consists in directly using the value of the transformation coefficients of the block. In both cases, the method of encoding then consists in applying a weighting, a quantification and then a Huffmann encoding.

In general, the intra-picture encoding of a block representing a portion of a picture in motion requires a larger amount of information than the inter-picture encoding. Conversely, the inter-picture encoding of a block representing a static portion of picture generally requires less information than the intra-picture encoding. The choice of the type of encoding is common for all three types of signal to be encoded. In this example of implementation, the choice of the type of encoding consists in precisely determining the quantities of information respectively necessary in both cases for a same block of digital values to be encoded. Each quantity of information is computed by counting the number of encoded data bits supplied by the following series of operations: weighting, quantification, Huffmann encoding. The method then consists in transmitting the data supplied by the encoding requiring the smallest amount of information.

The weighting enables the exploitation of the fact that a suppression of information encoding certain transformation coefficients of a block of picture elements does not give rise to much degradation in the decoded picture. The coefficients corresponding to the low spatial frequencies of the picture are more sensitive to suppressions of information than the coefficients corresponding to the high spatial frequencies of the picture. The weighting is such that the coefficients corresponding to the low spatial frequencies are favoured. It consists in multiplying the value of the transformation coefficients or of the differences of the transformation coefficients of a block by a weighting coefficient which is given, for the brightness, by the following formula:

$$P^{lum}(u, v) = \exp\left[-\frac{R \cdot u^2 + v^2}{Pon^2 \cdot Nor}\right] \quad (3)$$

where u and v are respectively the index of the column and of the line of the coefficient or of the difference of coefficients to which the weighting applies; where R is a constant which depends on the size of the block and on the sampling frequency of the picture, its value being 1.4 for a sampling frequency of 10.125 MHz and for a block of size 16×16; where Nor is a constant parameter but depending on R which is given by the following formula:

$$Nor = \frac{2 \times 16^2}{R \times 16^2 + 16^2} \quad (4)$$

Nor=0.42 for a sampling frequency of 10.125 MHz;

and where Pon is a variable parameter which defines the severity of the weighting. Its value depends on the filling of the buffer memory storing the encoded information to be transmitted, corresponding to the three types of signal representing the picture elements. This information is the information relating to the blocks preceding the block of picture elements being encoded. The number of bits in question is that obtained after the Huffmann encoding of the non-zero values, the encoding by sequences of zero values, and after insertion of data separating words. The severity of the weighting is an increasing function of the filling of the buffer memory, in order to act against this filling.

In this example of implementation, the capacity of the buffer memory is 64 kilobits. The value of the parameter Pon, and the weighting ratio obtained, between the high and the low spatial frequencies of the picture are given in the following table:

| Fitting of buffer memory | Value of the Pon parameter | Value obtained for the weighting ratio high/Low frequencies |
|---|---|---|
| 64 to 48 Kb | 18 | 5 |
| 48 to 40 Kb | 18.5 | 4.5 |
| 40 to 32 Kb | 19 | 4 |
| 32 to 24 Kb | 20 | 3.5 |
| 24 to 16 Kb | 22 | 3 |
| 16 to 8 Kb | 24 | 2.5 |
| 8 to 0 Kb | 27 | 2 |

The value of the transformation coefficients or of the differences of the transformation coefficients for the color difference signals, is weighted by a coefficient given by the formula:

$$P^{ch}(u, v) = \exp - \left[ \frac{R' \cdot \left(\frac{u}{2} + 1\right)^2 + v^2}{Pon^2 \cdot Nor'} \right] \quad (5)$$

where R' is a constant which depends on the size of the block and on the sampling frequency for the color difference signal and which is equal to 0.7 for blocks of 16×8 and for a sampling frequency of 5.0625 MHz; and where Nor' is a constant which is given by the following formula:

$$Nor' = \frac{2 \times 16^2}{R' \times 16^2 + 16^2} \quad (6)$$

Nor'=0.59 for a sampling frequency of 5.0625 MHz.

The weighting coefficient $P^{ch}(u, v)$ is also a function of the filling of the buffer memory, by means of the variable Pon, in order to participate in the process of regulation of the data rate of the transmitted encoded information. The weighting coefficient is the same for the data encoded by the inter-picture encoding and for that encoded by the intra-picture encoding.

The method of regulation furthermore consists in multiplying the value of the transformation coefficient or of the differences of transformation coefficients of a block by a quantification coefficient which is a function of the filling of the buffer memory, the latter containing the encoded data corresponding to the blocks preceding the block being encoded.

The quantification operation is performed in parallel on the transformation coefficients obtained by the intra-picture encoding and on the differences of transformation coefficients obtained by the inter-picture encoding, after the weighting operation. For a given block of picture elements, all of the transformation coefficients and all of the differences of transformation coefficients corresponding to the brightness are multiplied by the same quantification coefficient value. All of the transformation coefficients and all of the differences of transformation coefficients corresponding to the two color difference signals are multiplied by a weighting coefficient which has the same value as that corresponding to the brightness, except for the application of a constant multiplication factor. This constant is equal to 1.41 in order to compensate for a constant multiplication factor introduced during the computation of the cosine transforms and which is slightly different for blocks of different sizes, as is the case for the brightness on the one hand and for the color differences on the other hand.

The quantification coefficient is constant for a filling $E_b$ of the buffer memory, less than a threshold value; it is exponentially decreasing when the filling $E_b$ is above this threshold value. In this example, in which the capacity of the buffer memory is equal to 64000 bits, the filling threshold value is taken as equal to 56000 bits. For the brightness, the quantification coefficient is given by the following formula:

$$N^{lum} = \exp\left(-\frac{E_b - 56000}{Nor}\right) \text{ if } E_b \geq 56000 \text{ bits} \quad (7)$$

$N^{lum}=1$ if $E_b<56000$ bits

For the color difference signals, the quantification coefficient is given by the following formula:

$$N^{chr} = 1.41 \cdot \exp\left(-\frac{E_b - 56000}{Nor'}\right) \text{ if } E_b \geq 56000 \text{ bits} \quad (8)$$

$N^{chr}=1,41$ if $E_b<56000$ bits where the constants Nor and Nor' have the previously defined values.

The values of the transformation coefficients or of the differences of transformation coefficients are truncated after the weighting and the quantification in order to round them to the closest whole value.

Figure 2:
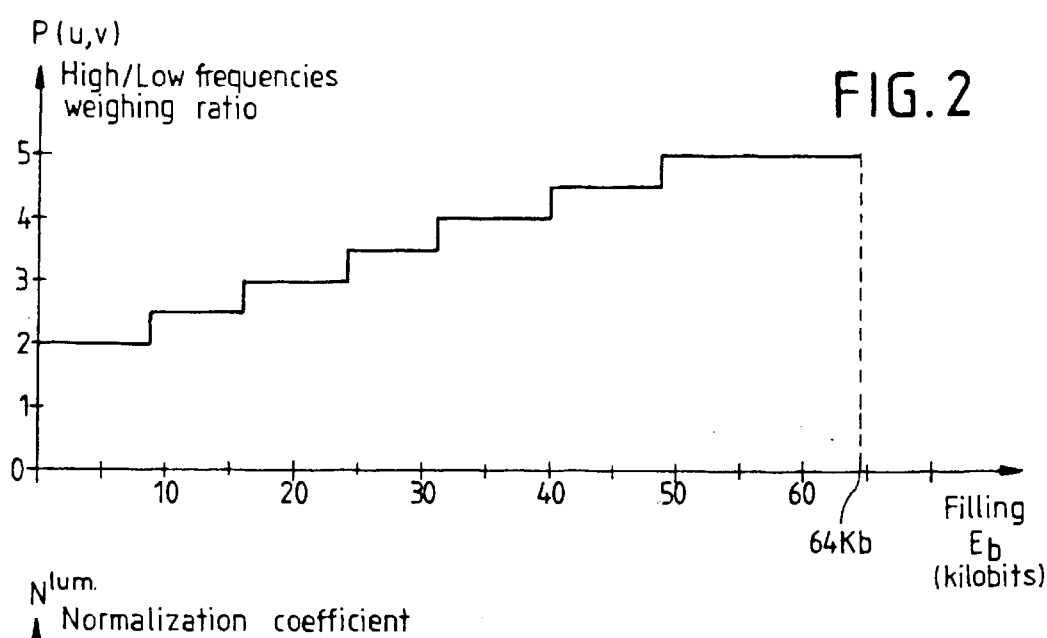
FIG. 2 shows a graph illustrating a weighting performed in this example of implementation.

FIG. 2 shows the graph of the ratio between the weighting coefficient applied to the high spatial frequencies and the weighting coefficient applied to the low spatial frequencies of the picture, for the brightness, as a function of the filling Eb of the buffer memory. It increases in steps as the filling varies from 0 to 64 Kbits.

Figure 3:
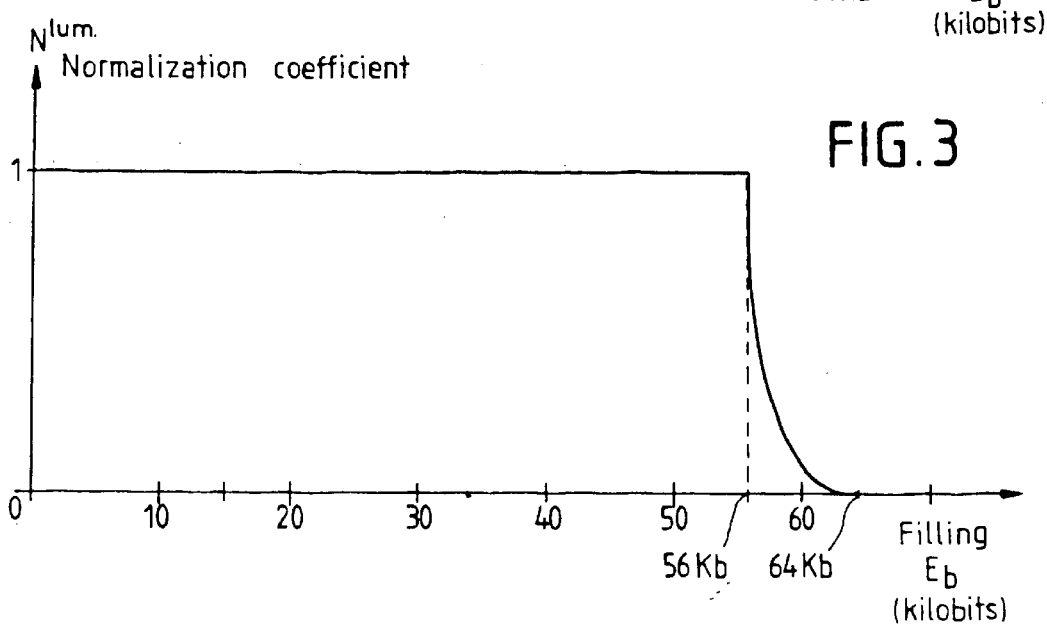
FIG. 3 shows a graph illustrating a quantification performed in this example of implementation.

FIG. 3 shows the graph of the quantification coefficient $N^{lum}$, corresponding to the brightness, as a function of the filling $E_b$. It can clearly be seen on this graph that the quantification coefficient is constant for most of the filling values and that it decreases very rapidly when the filling is close to its maximum. The relationship between the quantification coefficient and the filling, in the method according to the invention, is therefore clearly different from those used conventionally and which vary continuously. A conventional quantification coefficient does not include such a horizontal level but decreases regularly as a function of the filling.

Figure 4:
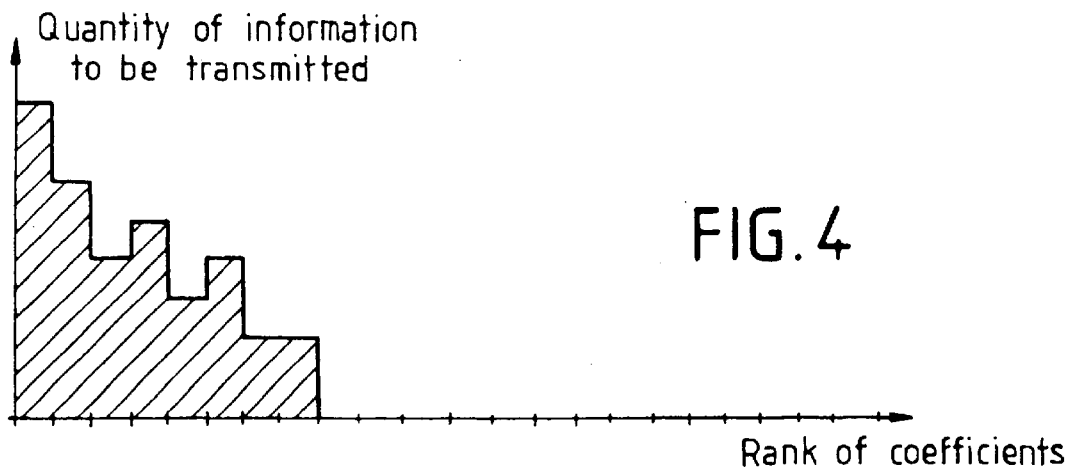
FIGS. 4 to 6 illustrate the regulation of the data rate of the transmitted information in this example of implementation.
Figure 5:
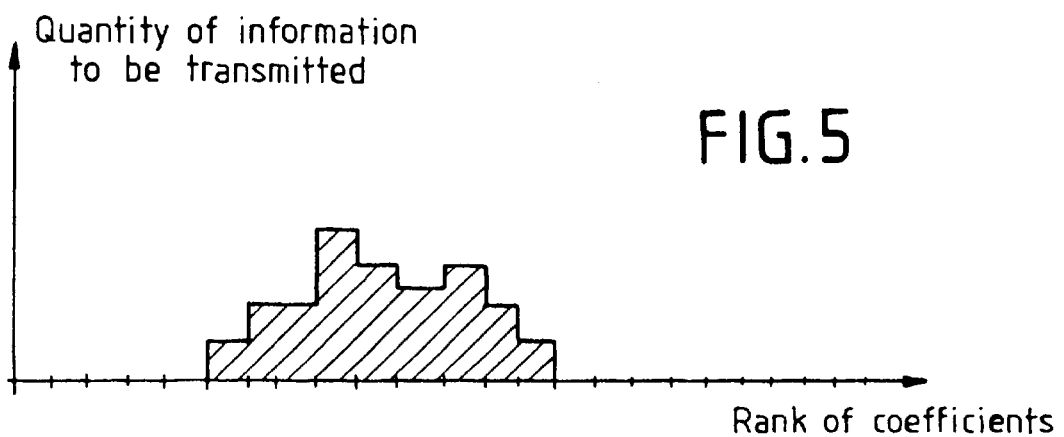
Figure 6:
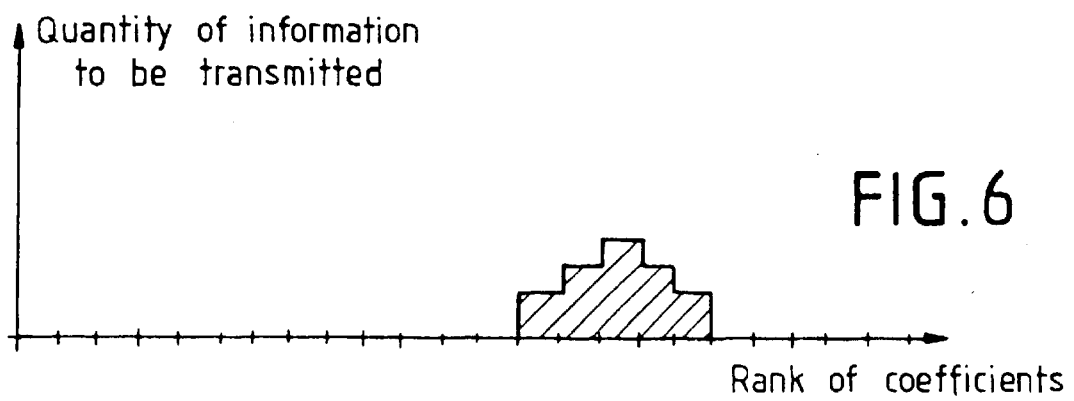

FIGS. 4, 5 and 6 illustrate the regulation process, in the case in which three successive pictures represent a static scene. Each of these figures shows a graph in which the quantity of information actually transmitted is plotted vertically and in which the rank of the transformation coefficients or of the differences of transformation coefficients of each of these pictures is plotted horizontally, this rank being determined on the scanning path shown in FIG. 1. The quantities of information concerned are those obtained after the weighting, the quantification and the Huffmann encoding.

However, the quantity of information corresponding to the first transformation coefficient, i.e. having 0 as a line index and as a column index, is not shown in FIGS. 4 to 6 as it is not subject to the data rate regulation. The first coefficient is not weighted and is not standardized in order to avoid showing visible discontinuities between the blocks on the restored picture. FIGS. 4 to 6 therefore show the quantity of information corresponding only to the other transformation coefficients or differences of transformation coefficients.

The first picture of these three successive pictures is assumed to be different from the pictures having possibly preceded it. The transformation coefficients of this first picture are therefore alt encoded by an intra-picture encoding necessitating a large amount of information, which is particularly distributed over the transformation coefficients having a low rank. In addition, the weighting has the effect of also favouring the coefficients of low rank. And, finally, certain coefficients of high rank are rounded to zero during the operation consisting in rounding to the closest whole value. Everything happens as if there were a threshold at +0.5 and −0.5. For all of these reasons, in FIG. 4, the coefficients of high rank are not transmitted by any quantity of information. In particular, many coefficients of high rank are rounded to the zero value because they are less than 0.5 in absolute value. The number of coefficients or differences of coefficients rounded to zero increases when there is a reduction in the quantification coefficient resulting from a large amount of filling of the buffer memory. The threshold effect combined with the quantification therefore tends also to suppress information corresponding to high spatial frequencies.

FIG. 5 corresponds to a second picture which immediately follows the first one and which is identical to it. The transformation coefficients of the second picture are therefore theoretically strictly identical to those of the first picture. They will be encoded by an inter-picture encoding in order to exploit the correlation between the first and second pictures. The inter-picture encoding is performed by computing the difference between the transformation coefficients of the second picture and the transformation coefficients of the first picture after having submitted the latter to an encoding and then to a decoding in order to subtract a same value during the encoding step and during the decoding step.

The weighting and quantification operations suppress information and therefore cause encoding errors which result in a non-zero difference between the transformation coefficients before encoding and the transformation coefficients after encoding followed by decoding. There are therefore non-zero differences between the coefficients encoded and then decoded for the first picture and the coefficients which will be encoded for the second picture. These differences are in particular due to the fact that the weighting coefficient and the quantification coefficient vary from one picture to another.

FIG. 5 shows the quantity of information corresponding to these differences of coefficients, these differences having undergone a weighting, a quantification and a Huffmann encoding. The quantity of information constituted by these differences is lower than the quantity of information corresponding to the values of the transformation coefficients of the first picture for several reasons. Firstly, because the differences of coefficients have low values, since the first picture and the second picture are identical. This quantity of information corresponds above all to the average frequencies and to the high frequencies, i.e. to the average ranks and to the high ranks, because the weighting and quantification performed during the encoding of the first picture have sacrificed the information corresponding to the average ranks and to the high ranks. This information will enable the addition of details in the second restored picture. The encoding of all of the blocks of the second picture being an inter-picture encoding, using the correlation with the first picture, the quantity of information to be transmitted diminishes the buffer memory empties in consequence and the regulation process causes an increase in the quantification coefficient and then its maintenance at the constant value: 1.

The increase in the quantification coefficient increases the amplitude of the differences of transformation coefficients and therefore tends to increase the quantity of information to be transmitted for the coefficients of average and high ranks, and therefore tends to fill the buffer memory. However, the leveling of the quantification coefficients slows down this tendency. Furthermore, the information to be transmitted corresponds in particular to the average and high spatial frequencies since the information corresponding to the low spatial frequencies has been transmitted to a large degree during the encoding of the first picture. The weighting acts progressively against the high frequencies as the buffer memory becomes filled. Therefore the weighting itself also tends to reduce the quantity of information transmitted for the second picture. Finally, this quantity if distinctly less than that transmitted for the first picture.

The encoding of a third picture identical to the two previous ones is also an inter-picture encoding and only has to transmit information corresponding to high spatial frequencies which have not been able to be transmitted during the encoding of the first and second pictures. This information will enable the addition of fine details to the restored third picture. Thus when there is a series of static pictures, the restored pictures rapidly achieve a very good fidelity.

FIG. 6 shows the quantity of information to be transmitted for the third picture, as a function of the rank of the coefficients. It should be noted that this quantity of information corresponds in particular to the very high spatial frequencies and that it is generally smaller with respect to the quantity of information to be transmitted for the encoding of the second picture and for the encoding of the first picture, because the weighting very much acts against the very high frequencies, even though the buffer memory is beginning to empty. The severity of the quantification and the weighting is chosen such that the regulation does not tend to maintain the filling at a constant level, but tends to reduce the filling during each inter-picture encoding.

In the most general case, each picture comprises static areas and areas in motion. The blocks located in the areas in motion require an intra-picture encoding which tends to saturate the buffer memory. The severity of the weighting and the quantification is chosen such that the memory is not saturated by the information corresponding to these blocks. The weighting is a function of the filling of the buffer memory in such a way that it acts to a lesser degree against the coefficients or the differences of coefficients corresponding to the high spatial frequencies, as the filling diminishes. But the severity of the weighting remains such that the buffer memory empties when there is a series of blocks encoded by the inter-picture encoding, in order to have a capacity available for the encoding of blocks encoded by an intra-picture encoding which produces a large amount of information to be transmitted.

Thus when one or more successive blocks have to be encoded by an intra-picture encoding, the buffer memory is not close to saturation and consequently the quantification coefficient does not have to be suddenly increased in order to avoid an overshooting of the capacity of the buffer memory when a block to be encoded by the intra-picture encoding arrives. By avoiding sudden variations in the quantification coefficient, this regulation process avoids suddenly degrading the quality of restoration of the picture from one block to another in the same picture. This makes it possible to avoid a visible contrast in the quality of restoration, between blocks encoded by inter-picture encoding and blocks encoded by intra-picture encoding, close to each other in the same picture.

Since the method according to the invention consists in multiplying the transformation coefficients or differences of transformation coefficients corresponding to the brightness and to the color difference signals, by the same weighting coefficient and by the same quantification coefficient, apart from the application of a constant multiplication factor, these three types of signals are therefore encoded with the same quality within a same block, and the information to be transmitted can be stored in a common buffer memory. This storage in a common buffer memory enables the transmission of the encoded information with any ratio between the quantities of information corresponding to the three types of signals. The absence of an imposed ratio between the quantities of information transmitted for the three types of signals enables, with equal fidelity, an important gain in the compression rate of the pictures.

In fact, the quantity of information to be transmitted for the two color difference signals is extremely variable depending on the scenes represented by the pictures. When the pictures have colors which are not very saturated, the quantity of information to be transmitted for the color difference signals is low. In this case, the common regulation enables the transmission of a reduced quantity of information for the color difference signals, unlike the conventional method of independent regulation for the three types of signals, which leads to the use of three independent buffer memories and imposes a constant ratio between the quantities of information transmitted for the three types of signals.

The filling $E_b$ of the buffer memory must be known before starting the encoding of a block in question. It must take into account the encoded information corresponding to all of the blocks which precede the block in question. It is computed by adding the quantities of information to be transmitted for alt of the blocks preceding the block in question, and by subtracting from this sum the quantity of information transmitted, computed by taking the product of the data rate of the transmission channel and the duration which has elapsed between the start of the transmission and the end of the transmission of the information encoding the block preceding the block in question.

After the quantification, each value of a transformation coefficient or difference of transformation coefficients, with the exception of the first coefficient in each block, and with the exception of the zero values, is encoded by a Huffmann code. The transformation coefficients or differences of transformation coefficients of one block are considered successively in the order of scanning corresponding to increasing $u^2+v^2$, according to FIG. 1. The coefficients or differences of coefficients which are zero are encoded by sequences, the lengths of the sequences being encoded by a Huffmann code. The order of scanning chosen is such that the series of coefficients or of differences of coefficients of a block always ends with a long sequence of zero values. The first coefficient or the first difference of coefficients of each block, having 0 as a line index and as a column index, is transmitted without Huffmann encoding.

In order to optimize the reduction of the data rate, the Huffmann encoding is performed according to 8 different trees;

A1, for encoding the transformation coefficients corresponding to the brightness signal, which are preceded by a sequence of zeroes;

A2, for encoding the transformation coefficients corresponding to the brightness signal, which are not preceded by a sequence of zeroes;

A3, for encoding the differences of transformation coefficients corresponding to the brightness signal, which are preceded by a sequence of zeroes;

A4, for encoding the differences of transformation coefficients corresponding to the brightness signal, which are not preceded by a sequence of zeroes;

A5, for encoding the transformation coefficients corresponding to any of the color difference signals, which are preceded by a sequence of zeroes;

A6, for encoding the transformation coefficients corresponding to any of the color difference signals, which are not preceded by a sequence of zeroes;

A7, for the encoding of the differences of transformation coefficients corresponding to any of the color difference signals, which are preceded by a sequence of zeroes;

A8, for the encoding of differences of transformation coefficients corresponding to any of the color difference signals, which are not preceded by a sequence of zeroes.

However, it is possible to use identical encoding trees A5 and A7; and identical encoding trees A4, A6 and A8, at the cost of a certain degradation in the compression rate. It should also be noted that the encoding trees also encode particular events: packing bits and data separator words.

The fact of using two different trees for encoding the values of coefficients or of differences of coefficients which are not zero and which are not preceded by a sequence of zeroes and for encoding the coefficients or differences of coefficients which are not zero and which are preceded by a sequence of zeroes, results in a reduction in the quantity of information to be transmitted in the order of 10% with respect to the known methods in which a single encoding tree is used for these two separate cases. The reason for this reduction is as follows: a priori, it would be necessary to have two separate trees, with a prefix to distinguish them from each other, in order to encode on the one hand a sequence of zeroes and, on the other hand, to encode a coefficient or a non-zero coefficient difference. But there are never two consecutive sequences of zeroes, as in this case they would be encoded as a single sequence. Consequently, it is certain that after a sequence of zeroes there is a coefficient or a difference of coefficients which is not zero. It is known information which does not therefore have to be transmitted. The use of the two trees mentioned above enables this redundancy of information to be exploited in order to reduce the quantity of information to be transmitted.

In this example of implementation, the Huffmann codes used for encoding the coefficients have a dynamic range limited to −63,+63. Those used for encoding the differences of coefficients have a dynamic range limited to −31, +31. In the case of overshoot, at least one overshoot prefix is added. In order to distinguish the 0 modulo +64 and the 0 modulo −64 values, two distinct code words are added. The multiple values of +64 and −64 are respectively denoted 0+ and 0− in the following description and they encoded using several overshoot prefixes. The last sequence of zeroes in each block is not encoded, the encoded data corresponding to each block being separated by an inter-block synchronization word. The value of the first coefficient or of the first difference of coefficients in each block is represented in clear by nine bits.

The eight Huffmann trees satisfy the following conditions:
 the code words all have a length less than 16 bits;
 no licit concatenation of code words must make a series of 10 zeroes appear, consequently:
  the code words cannot terminate, unless by exception, in more than 5 zeroes;
  the word "00000" is reserved for precise uses;
  the code words cannot begin with more than 4 zeroes;
 only the encoding trees corresponding to the color difference signals include synchronization words.

The encoding tree A1 encodes 195 events. The non-zero coefficients give rise to 129 possible events which are: the values −63, . . . , −1, 1, . . . , +63; an overshoot prefix relating to the coefficients; a value which is a multiple of +64, which is referenced 0+; a value which is a multiple of −64, which is referenced 0−.

The sequences of zeroes give rise to 65 possible events: the values of length:1, . . . , 63: an overshoot prefix relating to the sequences of zeroes; and a zero value $0_p$ associated with the sequences of zeroes.
 A particular event is constituted by a packing.

The conditions which this tree A1 must satisfy are as follows: the event 0+ must be encoded by "00000"; the code words must end in at least 3 zeroes; and the over-shoot prefix for the coefficients must end in 1.

The tree A2 encodes 129 events: the values −63, . . . , −1, 1, . . . , 63; an overshoot prefix relating to the coefficients; a value which is a multiple of +64, referenced 0+; a value which is a multiple of −64, referenced 0−. This tree must satisfy the following condition: the shortest code word must have a length of two bits and be constituted by "00". There is no prohibited event.

The tree A3 encodes 195 events and has the following characteristics:
 the non-zero coefficients give rise to 129 events: the values −63, . . . , −1, 1, . . . , 63; an overshoot prefix relating to the coefficients; a value which is a multiple of +64; and a value of which is a multiple of −64;
 the sequences of zeroes give rise to 65 events:
 the values 1, . . . , 63; an overshoot prefix relating to the sequences of zeroes; a value $0_p$ relating to the sequences of zeroes;
 a particular event is constituted by a packing.

This tree A3 must satisfy the following conditions:
 the value which is a multiple of +64 is encoded by "00000"; the code words must not end in more than 4 zeroes; the length of the code words, for the lengths of sequences of zeroes, is greater than three bits; and the overshoot prefix relating to the coefficients must end in a 1.

The tree A4 must encode 65 events which are: the values of non-zero coefficients: −31, . . . , −1,+1, . . . , 31; an overshoot prefix relating to coefficients; a value which is a multiple of +31; a value which is a multiple of −31. This tree must satisfy the following condition: the shortest code word must have a length of one bit and be equal to 0. There is no prohibited event.

The tree A5 encodes 131 events and must have the following characteristics: 65 events for the coefficients, constituted by the values −31, . . . , −1, +1, . . . , 31; an overshoot prefix relating to coefficients, 0+, 0−; 65 events for the sequences of zeroes; the values −1, . . . , 63, an overshoot prefix associated with the sequences of zeroes, and the zero length; a particular event which is constituted by an intra-block synchronization word. This tree must satisfy the following conditions: the value 0+ must be encoded by 00000; the sequences of zeroes cannot end in more than 4 zeroes; the length of the sequences of zeroes must be greater than 3; and the code of the overshoot prefix relating to the coefficients must end in 1.

A particular event is constituted by an intra-block synchronization word.

The tree A6 encodes 65 events and it is identical to the tree A4.

The tree A7 encodes 131 events and it is identical to the tree A5.

The tree A5 encodes 65 events and it is identical to the tree A5.

An optional refinement of the method according to the invention consists in making the weighting coefficient and the quantification coefficient functions of a parameter called the category of the block of elements being encoded. This parameter represents the difficulty of restoration of this block of picture elements. In fact, experience shows that the worst restored blocks are characterized by the fact that they contain at least one relatively uniform dark area extending over at least one block of picture elements adjacent to the block in question, the boundary between the two blocks passing through the dark area over a relatively long length. In such a case the dark area is encoded differently on either side of the boundary, which makes the division of the picture into blocks visible, particularly because the granular noise is not restored in the same way and is visible particularly in a dark area.

In one example of implementation, the method consists in classifying the blocks of picture elements into eight categories numbered from 1 to 8 according to the increasing difficulty in restoring them without making the boundaries between the blocks appear. It consists in sub-dividing each block of 16×16 elements into blocks of 4×4 elements, then in computing the average value of the brightness in each of the sub-blocks of 4×4 elements. In practice, only the sub-blocks located at the periphery of a block are considered.

Figure 7:
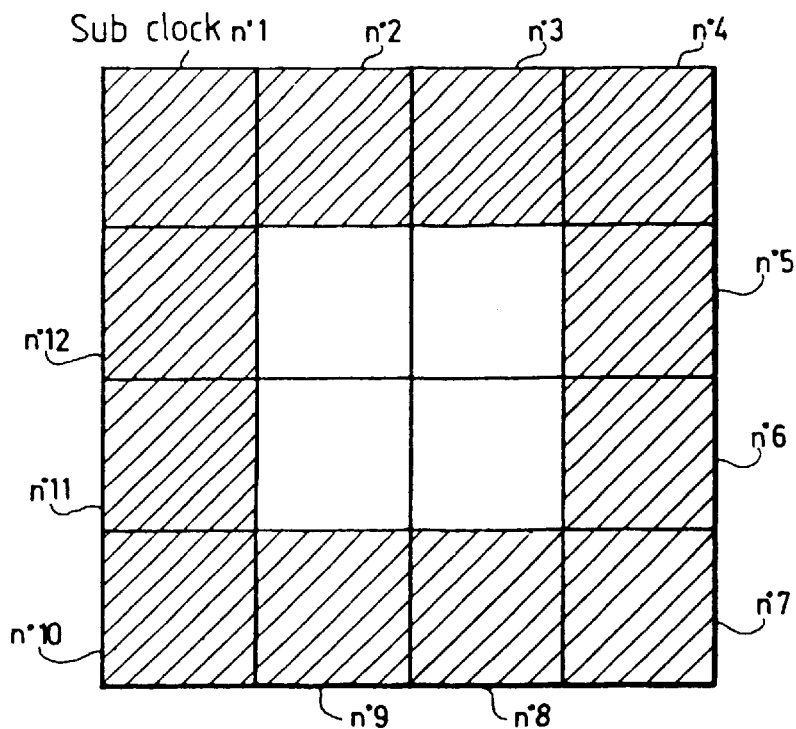
FIGS. 7 and 8 illustrate the implementation of a variant of the method according to the invention.
Figure 8:
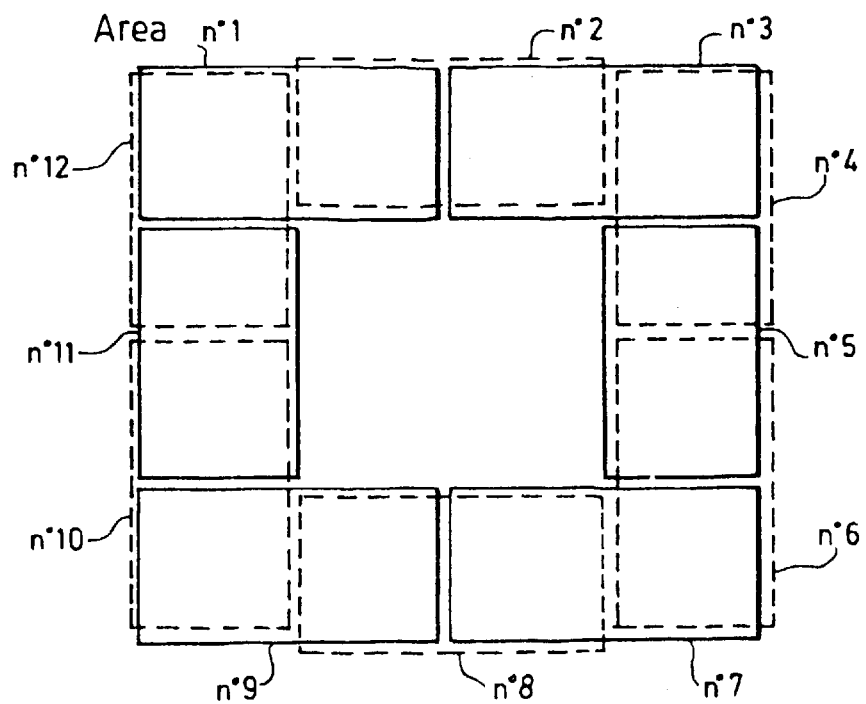

FIG. 7 shows an example of a block, with the twelve sub-blocks for which an average value of the brightness is computed. The latter are cross-hatched. The method then consists in computing an average value of brightness in areas of elongated shape located at the periphery of the blocks of picture elements and covering two adjacent sub-blocks. These areas partially overlap. In FIG. 7 the sub-blocks are numbered in the clockwise direction starting from the one located in the upper left-hand corner. In FIG. 8 the areas are numbered in the clock-wise direction starting from the one located in the top left corner. For example the area N°1 covers the sub-block N°1 and sub-block N°2. The area N°2 covers the sub-block N°2 and the sub-block N°3. The average brightness value in an area is equal to the half-sum of the average brightness values of the two sub-blocks enclosed by this area. This average brightness value is computed according to the following formula:

$$L(\text{area } N^\circ i) = \tfrac{1}{2}(L(\text{block } N^\circ i) + L(\text{block } N^\circ(i+1))) \tag{9}$$

For i=1 to 12; and where L(block N°i) and L(block N°i(+1)) respectively represent the average brightness value in block N°i and the average brightness value in block N°i+1.

The method then consists in determining the area having the smallest average brightness value. This minimum brightness value is referenced Lmin and determines the difficulty of encoding the block in question. The method then consists in classifying the block in question into a category of difficulty from among eight categories, by comparing the minimum brightness value with seven threshold values and consists in determining a weighting coefficient and a quantification coefficient depending on the category of difficulty determined for the block in question.

The severity of the weighting and of the quantification coefficient is reduced as the difficulty of encoding a block becomes greater, i.e. as the determined minimum brightness becomes lower. The distribution of the blocks into eight categories of difficulty enables a progressiveness in the reduction of severity in the weighting and quantification when the encoding difficulty increases.

Another optional characteristic of the method according to the invention consists in the protection against the propagation of errors, a propagation associated with the differential inter-picture encoding method. If similar blocks in a series of pictures, i.e. having the same position in each of the pictures in the series, are encoded using inter-picture encoding, an error in the first block is repeated in all of the following similar blocks. When such an error can be detected, it is possible to replace all of the incorrect block by the similar block of picture elements in the picture preceding the one containing the incorrect block. As the pictures are, in this example, constituted of two separately encoded frames, the similar block is a block of elements of the frame preceding the frame in question and having the same parity. However, this correction method does not restore a perfect picture and, consequently, it is therefore necessary to limit the propagation of errors by imposing an intra-picture encoding for each block having a given position, with a fixed maximum interval corresponding, for example, to 30 pictures. If the intra-picture encoding is imposed at random or periodic times, the cost in data rate is significantly increased.

The method according to the invention enables the limitation of the propagation of errors with a slight increase in the information data rate. It comprises a first criterion consisting in imposing the intra-picture encoding when, for a given block, the relative difference of the cost of inter-picture encoding and the cost of intra-picture encoding is less than a first threshold value, or when the given block has not been encoded by an intra-picture encoding for a number of pictures N(i,j) greater than a second fixed threshold value; (i,j) being coordinates marking the position of the block in a picture. The first threshold value can be a function f(N(i,j)) of the number of pictures since the given block was encoded by an intra-picture encoding. It is an increasing function in such a way that it causes an intra-picture encoding at the end of a certain time, even if the relative cost difference remains constant.

The relative difference between encoding costs is computed by taking the difference between the number of bits necessary for the encoding of the block using an intra-picture encoding and the number of bits necessary for encoding the block using an inter-picture encoding, and in dividing this difference by the number of bits necessary for encoding the block using an inter-picture encoding. The function f(N(i,j)) can be a function of the form $A.N^2(i,j)$ or $A.N^3(i,j)$, in which A is a constant chosen such that the forcing takes place at the latest after 50 frames encoded by inter-picture encoding. In practice, it is necessary to provide a second criterion enabling the number of pictures during which a given block is encoded by inter-picture encoding to be limited in a definite way. This second criterion consists in comparing the number of pictures during which the given block has been encoded by inter-picture encoding with a second threshold value No fixed for example at 50, which corresponds to 50 frames and therefore to a duration of 1 second in a European television standard.

In certain cases, these criteria can lead to a large number of intra-picture encoding forcings in a same picture. In order to avoid a sudden increase in the quantity of information to be transmitted, it is necessary to stagger in time the intra-picture encoding forcing operations. For this purpose, the method furthermore consists in imposing an intra-picture encoding only for successive blocks separated by an interval greater than a third fixed threshold value. For example, it can consists in only allowing the forcing for blocks whose number, in the frame in question, is equal to $N_1$ modulo 4, $N_1$, being a whole value varying from 0 to 3 and changing at each frame. In this example, any block is encoded by an intra-picture encoding with an interval at most equal to $N_0+4$ frames.

The encoding method according to the invention furthermore consists in transmitting with the encoded data synchronization information enabling the sampling frequency of the pictures to be recovered after transmission over an asynchronous channel; and furthermore consists in transmitting separators enabling the nature of the various encoded data which are transmitted in series over the transmission channel to be recovered.

In order to recover the frequency called the video frequency of the picture sampling, two types of synchronization patterns are transmitted independently from the encoded data and their separators, while freezing the transmission of these encoded data. A picture synchronization pattern is transmitted at a frequency of 25 Hz, before the encoded data of each even frame; and a line synchronization pattern is transmitted at the frequency of 15625 Hz, in order to slave a clock to the picture elements sampling frequency. These two types of synchronization pattern do not have a fixed position with respect to the encoded data and are not shown in FIG. 9.

These two types of synchronization pattern do not have to be such that they cannot be imitated by concatenations of data, because these patterns are separated by a given number of bits, determined to the nearest 1 bit. A learning process, consisting in checking the presence of successive patterns at times provided for this, enables them to be distinguished from data.

Figure 9:
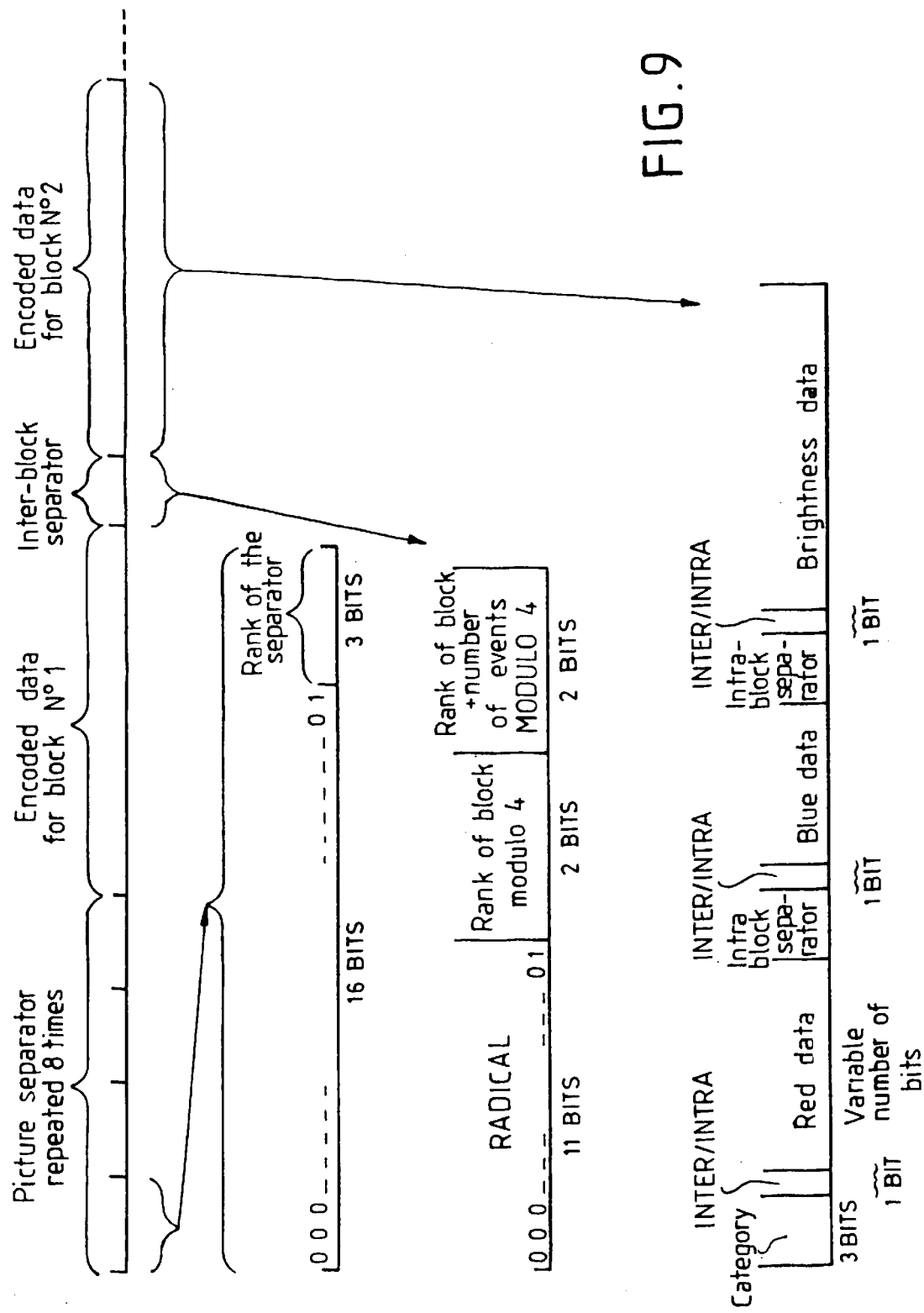
FIG. 9 shows the synchronization signals of an encoder and a decoder, in an example of implementation of the method according to the invention.

The encoded data separators are shown in FIG. 9. The encoded data corresponding to two frames are preceded by a picture separator which is repeated 8 times in this example. Each picture separator comprises a 16-bit prefix comprising 15 zeroes and 1 one; and includes a 3-bit binary word giving the rank of the separator in the repetition. In practice, the number of repetitions is chosen as a function of the error rate in the transmission channel. The prefix is a binary word which cannot be imitated by a licit concatenation of Huffmann code words and of inter-block separator words. The repetition of the picture separators enables them to be protected from isolated errors and small packets of errors. The detection of a picture separator is only validated if it is made several times and the exact position of the picture separators is known by means of the 3 bits encoding the rank of each picture separator.

The encoded data corresponding to block N°1 are transmitted after the picture separator repeated 8 times. Then an inter-block separator is transmitted and precedes the encoded data for block N°2. The inter-block separator comprises an 11-bit radical constituted of 10 zeroes and 1 one; a two-bit binary word representing the rank of the block, modulo 4; and a two-bit binary word representing the sun modulo 4 of the rank of the block and the number of events encoded in the block following the inter-block separator. The radical thus constituted can be imitated by a licit concatenation of code words belonging to the eight Huffmann encoding trees. For this purpose the encoding trees comprise code words beginning with at most four 0 and ending in at most five 0. A code word including only 0 is prohibited since, if it were repeated, there would be imitation of the inter-block separator.

The lower section of FIG. 9 shows the format of the encoded data for a block. It comprises: a three-bit binary word representing the category of the block; a bit indicating the type of encoding, inter-picture or intra-picture, encoded data of the red color difference signal; then these data, with a number of variable bits; then an intra-block separator constituted by a Huffmann code word; then one bit called the inter-intra bit, indicating the type of encoding of the encoded data for the blue color difference signal; then an intra-block separator, constituted by a Huffmann code word; then a bit indicating the type of encoding for the brightness signal encoded data; then the encoded data of the brightness signal.

It should be noted that the picture separators introduce a negligible redundancy considering their rarity. The intra-block separators are essential since the last sequence of zeroes of each block is not encoded. They are not protected and do not therefore introduce redundancy. On the other hand, there is a redundancy in the inter-block separators. According to the prior art, the inter-block separators belonged to the inter-picture and intra-picture encoding trees of the brightness signal and had a length of 5 bits. The one used in this example of implementation has a length of 15 bits, giving a redundancy of 10 bits. Furthermore, the Huffmann encoding Furthermore, the Huffmann encoding trees of the color difference signals include a reserved word formed of five consecutive 0 for encoding the value 0+, which increases the average length of the Huffmann codes with respect to those used in the prior art. Redundancy of information in the inter-block separators is estimated as equal to at least 1% of the total transmitted information. This redundancy is low but enables the protection against errors of inter-block separators to be considerably improved.

A good detection of inter-block separators is essential as the loss of a single bit of the encoded data causes a total loss of synchronization of the decoding with respect to the encoding and therefore causes the loss of a complete picture.

In the case in which an inter-block separator is incorrect, it is possible to resynchronize the decoding with the encoding by means of the binary word representing the rank of the block, modulo 4.

There are at least four possibilities of detecting an error in a block, at inter-block separator level:

by detecting an inter-block separator before having detected the two intra-block separators contained in any normal block;

by detecting an inter-block separator whose beginning does not correspond with the end of the data of the preceding block, the end of these data being provided by means of the two-bit binary word representing the rank of the block plus the number of events modulo 4;

by detecting a block rank, modulo 4, not equal to the rank of the previous block incremented by 1;

by detecting a sum of a block rank and of a number of events, modulo 4, which is not equal to the sum of the rank of the block and of the the number of events received.

The reception of a block is only validated if none of these conditions occurs. Experience shows that the use of the rank of the block, modulo 4, and of the sum of the rank of the block and of the number of events, modulo 4, which are transmitted in the inter-block separators, enables a large majority of errors affecting the blocks to be detected.

When a block is detected as being incorrect, the method then consists in masking it by replacing it with the similar block in the frame which immediately precedes the frame being decoded. It should be noted that an isolated error in an inter-block separator gives rise to the masking of the block which precedes it and the block which follows it, since the end of the first and the start of the second are not correctly identifiable.

The most annoying type of error is constituted by packets of errors affecting at least four consecutive blocks, because in this case is it not possible to resynchronize the decoding with the encoding since the rank of the block is transmitted modulo 4. All of the following blocks, in the same picture, are shifted. The synchronization is only regained at the start of the next picture. Furthermore, the error propagates over the following images in the blocks encoded by inter-image encoding. It is possible to increase resistance to errors of the inter-block separators by increasing the modulo of the word representing the rank of the block and of the word representing the sum of the rank of the block and the number of events.

Figure 10:
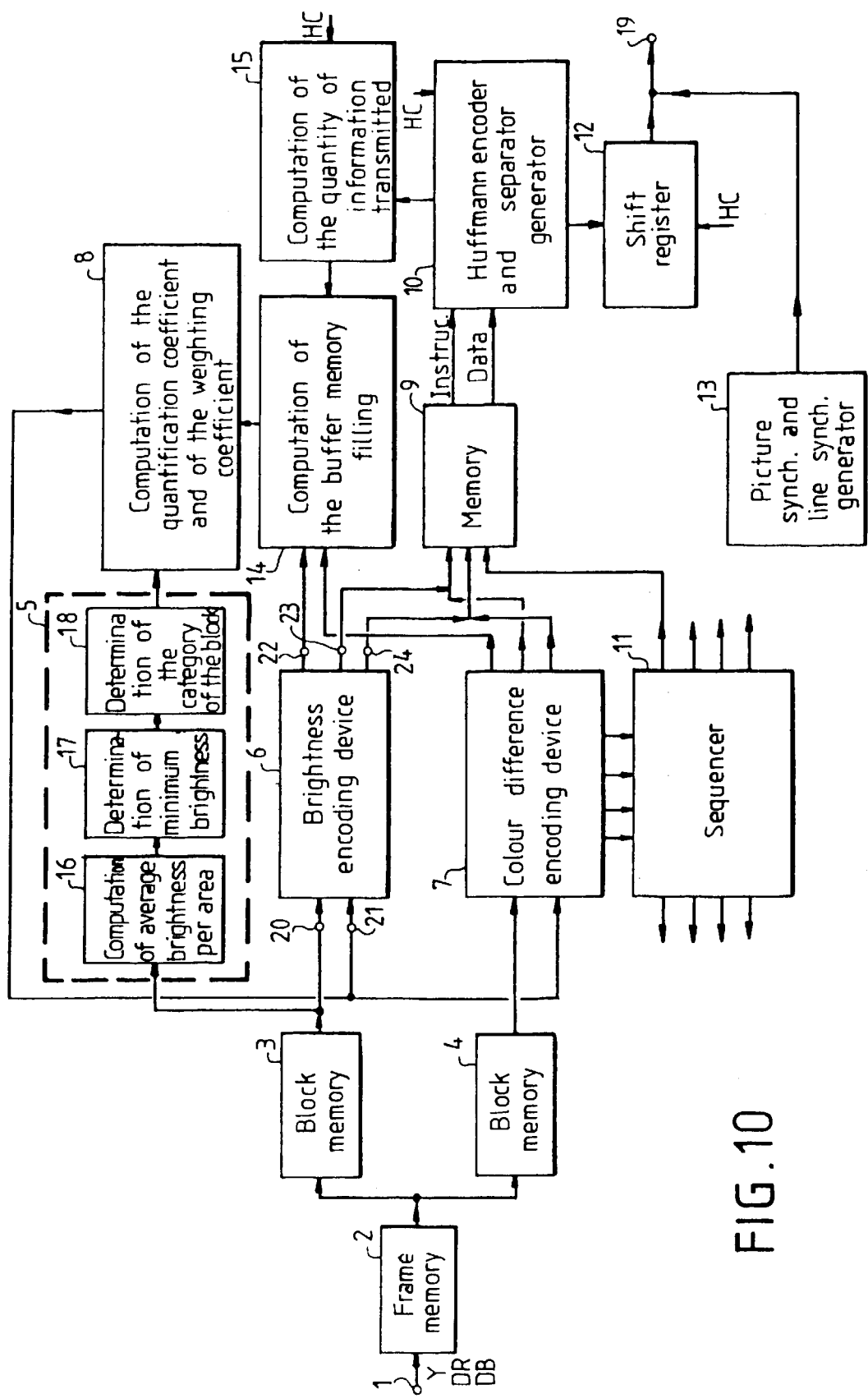
FIGS. 10 and 11 show the block diagram of an embodiment of an encoding device for the implementation of the method according to the invention.

FIG. 10 shows the block diagram of an embodiment of an encoding device for the implementation of the method according to the invention. This example comprises: an input terminal 1; a frame memory 2; a first and a second block memory 3 and 4; a device 5 for the classification of the blocks; a brightness encoding device 6; a color difference encoding device 7; a device 8 for computing the quantification coefficient and the weighting coefficient; a memory 9; a Huffmann encoder and separator generator device 10; a sequencer 11; a shift register 12; a picture synchronization and line synchronization generator 13; a device 14 for computing the filling of the buffer memory, constituted by the memory 9, the device 10 and the register 12; a device 15 for computing the quantity of transmitted information; and an output terminal 19 connected to an asynchronous transmission channel having a constant data rate of 10 Mb per second.

The input terminal 1 receives in parallel a brightness value Y, a red color difference value DR, and a blue color difference value DB in the form of a triplet of binary words. Each triplet represents an element of a picture. The series of pictures concerned is a conventional series of television pictures in which each picture is constituted from two interlaced frames but these two frames are independently encoded. The brightness signal is sampled at the frequency of 10.125 MHz and each of the color difference signals is sampled at a frequency of 5.06 MHz. The encoding devices 6 and 7 operate in parallel. While the device 6 encodes two brightness values, the device 7 encodes a red color difference value and a blue color difference value.

A data input of the frame memory 2 is connected to the input terminal 1. Read and write control inputs of this memory 2 are connected to the outputs of the sequencer 11 by links which are not shown. The sequencer 11 controls the storage of the values Y, DR, DB, as they become available. A data output of the memory 2 is connected to data inputs of the block memories 3 and 4. Control inputs of the memories 3 and 4 are connected to outputs of the sequencer 11 by links which are not shown. The sequencer 11 controls the reading from the memory 2 and the writing into the memory 3 of 16×16 brightness values representative of a block of 16×16 picture elements. It simultaneously controls the reading from the memory 2 and the writing into the memory 4 of 8×16 red color difference values and of 8×16 blue color difference values representative of the same block of picture elements.

A data output of the block memory 3 is connected to an input terminal 20 of the device 6 and to an input of the classification device 5. A data output of the block memory 4 is connected to an input of the device 7. Another input of the device 7 and an input terminal 21 of the device 6 are connected to an output of the device 8. The device 8 supplies the value of a quantification coefficient and of a weighting coefficient, calculated in order to regulate the data rate of the encoded information transmitted on the transmission channel. The device 8 has a first input connected to an output of the classification device 5, and a second input connected to an output of the computing device 14. The device 14 has a first input connected to an output of the device 15, a second input connected to an output terminal 22 of the device 6 and a third input to a first output of the device 7.

The memory 9 has: a first data input connected to an output terminal 23 of the device 6 and to a second output of the device 7; a second data input connected to an output terminal 24 of the device 6 and to a third out put of the device 7; and a third data input connected to an output of the sequencer 11.

The function of the memory 9 is to store the values of cosine transformation coefficients or of cosine transformation coefficient differences, or the lengths of sequences of zeroes, representing the brightness values or the color difference values in order to enable a regulation of the data rate of the encoded information sent in the channel. The data received by the first data input of the memory 9 are transformation coefficient values or transformation coefficient difference values or lengths of sequences of zeroes. The data received by the second data input of the memory 9 are indicators corresponding to the data applied to the first data input, in order to indicate the type of encoding, inter- or intra-picture, and the type of data: data corresponding to brightness values or to a red color difference or to a blue color difference, and indicating their coefficients or differences of coefficients which are not zero on the one hand, and the lengths of sequences of zeroes on the other hand.

The data received by the third data input of the memory 9 also corresponds to the data received by the first input and indicate the start of a block or, within a block, the start of the brightness data, or the start of the red color difference data or the start of the blue color difference data. These two indicators are stored in the memory 9 at the same time as a datum representing the brightness or a color difference and constitute an instruction for controlling the device 10, a Huffmann encoder and separator generator, in order to encode the data according to eight distinct Huffmann trees, and in order to supply the inter-block separators, the intra-block separators and the inter-picture separators. The memory 9 has two outputs respectively connected to two inputs of the device 10 in order to supply it in parallel with a datum and a corresponding instruction.

The memory 9 also has read and write control inputs respectively connected to outputs of the sequencer 11 by links which are not shown. The sequencer 11 controls the reading of data and of the corresponding instructions progressively as the device 10 encodes and transmits these data on the channel. The device 10 indicates to the sequencer 11 its availability by a link which is not shown.

The device 10 has an output connected to a parallel input of the shift register 12. The register 12 has an output connected to the output terminal 16 of the encoding device and has a control input receiving a clock signal HC which defines the transmission frequency an the channel. The picture synchronization and line synchronization generator 13, has an output also connected to the output terminal 14 in order to supply synchronization patterns at picture frequency and at line frequency. The generator 13 is controlled by the sequencer 11 by means of a link which is not shown. The transmission of the synchronization patterns is performed completely independently from the transmission of the encoded data and their separators while periodically freezing the transmission of these encoded data in order to transmit the synchronization patterns. These patterns will enable, after the decoding, the recovery of the picture and line frequencies which are asynchronous with respect to the channel frequency.

The device 10 is essentially constituted by a sequencer and by read only memories. The read only memories enable the performance of a transcoding from data supplied by the memory 9; this transcoding is a function of the type of data and the type of data is indicated by the instruction accompanying them. The sequencer is controlled by these instructions to select a read only memory corresponding to a Huffmann code appropriate to the data to be transcoded. The sequencer also supplies the binary words constituting the inter-block separators, the intra-block separators and the picture separators. This sequencer comprises counters for determining the rank of each picture separator, the rank of each block, modulo 4, and the sum of the rank of each block and of the number of events encoded in this block, modulo 4, in order to include these values in the separators, according to the previously described method.

The sequencer 11 supplies clock signals to all of the components of this encoding device and it supplies in particular control signals to the devices 6 and 7 with a period corresponding to the processing of a block of 16×16 picture elements. It should be noted that the values representative of the picture elements are stored in the frame memory 2 with stop time intervals corresponding to the line suppression and to the frame suppression. But these representative values are re-read from the memory 2 at a slightly slower rate, such that the reading is performed at a regular frequency without taking account of the line suppression and frame suppression time intervals.

An output of the device 10 is connected to a parallel input of the shift register 12 to supply it with a binary word corresponding to an encoded datum or to a separator. The shift register 12 transmits the bits of this binary word successively to the output terminal 19 under the effect of the clock HC which corresponds to the transmission frequency on the channel in question.

The device 8 supplies a weighting coefficient which is the same for the brightness encoding device 6 and for the color difference encoding device 7; and it supplies a quantification coefficient which is the same, except for the application of a multiplication coefficient, for the devices 6 and 7. These two coefficients therefore provide a common regulation for the data rate of the information to be transmitted corresponding to the brightness and for the information to be transmitted, corresponding to the color differences. The memory 9 stores both of these types of information to be transmitted together with indicators enabling these different types of information to be identified and constituting instructions for controlling the device 10.

As the memory 9 is placed upstream of the Huffmann encoder 10, the regulation of the flow of bits on the channel consists in fact in acting on the amplitude of the coefficients or coefficient differences, by the variable weighting and quantification, before encoding them by means of the Huffmann encoder. A reduction in the amplitude is represented by a reduction in the number of bits at the output of the Huffmann encoder. Everything happens as if there were, instead of the memory 9, the device 10, and the register 12, only a. buffer memory storing the binary data in series and restoring them in series to the channel. The device 14 in fact computes, not the filling of the memory 9, but the filling of this buffer memory. The filling of the buffer memory is equal to the quantity of binary information, in the form of Huffmann codes, remaining to be transmitted at the time in question. There is no mathematical relationship between the filling of the memory 9 and the filling of the buffer-memory. Consequently, the capacity of the memory 9 is chosen by considering the average length of the Huffmann codes. In this example, the average length is equal to 2 bits. The memory 9 has a capacity of 32K words, each word being constituted by a datum and an instruction, and corresponds to a capacity of 64K bits for the buffer memory as defined before.

The device 15 supplies to the device 14 the value of the quantity of information transmitted on the channel.

The devices 6 and 7 supply to the device 14 the cost of encoding each coefficient or difference of coefficients.

The device 14 computes the value of the filling of the buffer memory by accumulating the costs of encoding and by subtracting the transmitted quantity. Then it supplies the value of the filling to the computing device 8 which determines a quantification coefficient and a weighting coefficient according to the formulae (3) to (8), by modulating the severity of the quantification and of the weighting as a function of the category of the block determined by the device 5.

The counting device 15 determines the number of transmitted bits, from the clock signal MC which indicates to it the frequency of transmission on the channel, which is known and constant but which is asynchronous with respect to the sampling frequency of the pictures. The value of the ratio of weighting of the high frequencies with respect to the low frequencies corresponds to the values shown in FIG. 2. The brightness quantification coefficient has a constant value for a buffer memory filling varying from 0 to 56 Kb and then decreases exponentially for a filling varying from 56 Kb to 64 Kb.

The device comprises, in series, between its input and its output: a device 16 for computing the average brightness in the peripheral areas of each block of picture elements; a device 17 for determining the minimum brightness in each block; and a device 18 for determining the category of a block.

The device 5 computes the average brightness in 12 sub-blocks of 4×8 picture elements, at the periphery of each block, then computes the average brightness in 12 areas of 4×8 elements, according to the method previously described and illustrated in FIGS. 7 and 8. The device 17 determines the minimum value from among the average values computed by the device 16. The device 18 compares this average value with the 7 fixed threshold values and derives from this a binary word whose value can vary between 0 and 7 and which constitutes the category number of the block, representing the difficulty of encoding and of restoration of this block. The device 5 is controlled by the sequencer 11 by means of links which are not shown. The device 5 can be produced in the form of a hard-wired logic circuit or in the form of microprocessor and a program memory. In both cases, its embodiment is within the scope of a person skilled in the art.

Figure 11:
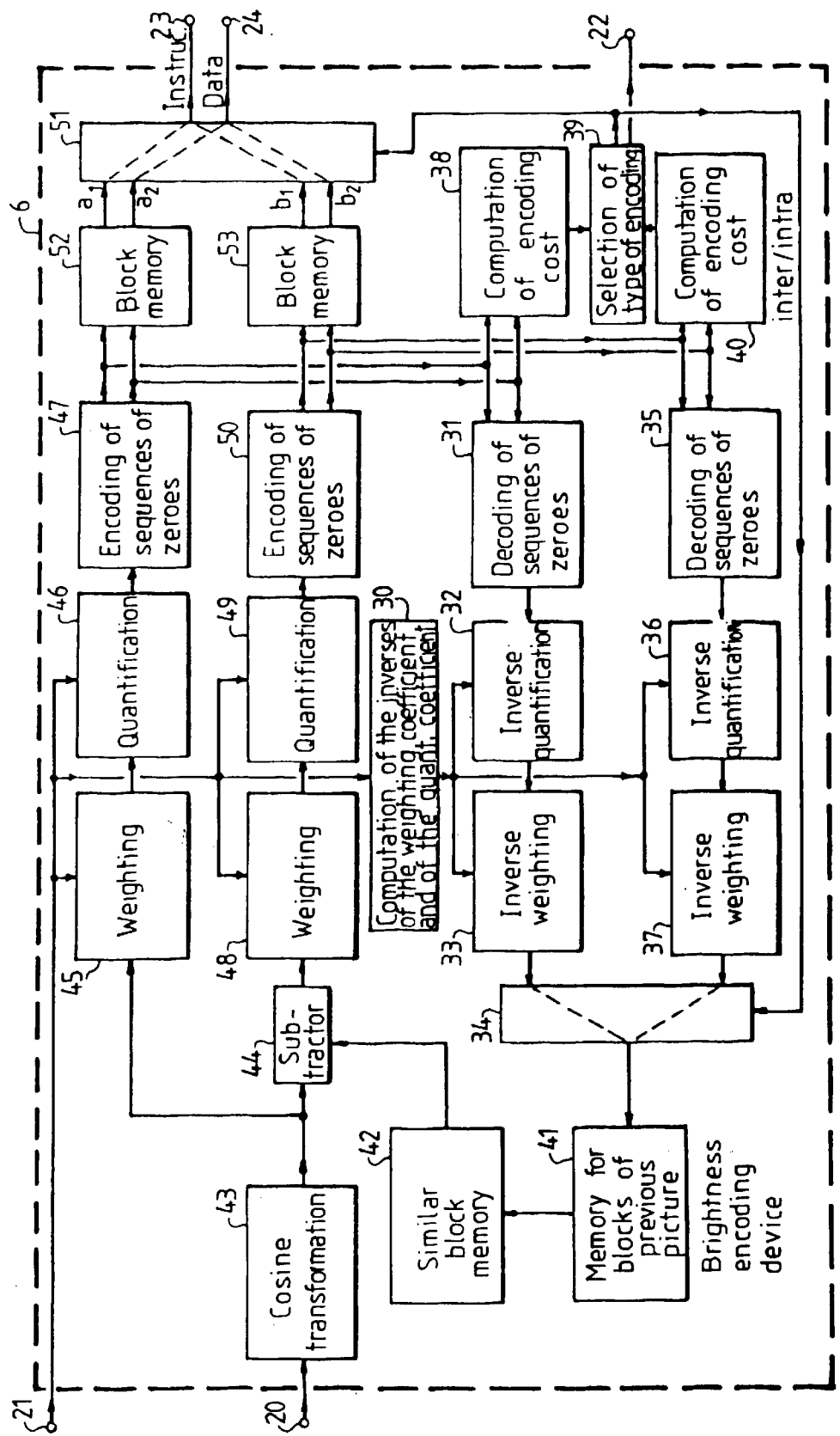

FIG. 11 shows the block diagram of the brightness encoding device 6. The device 7 has an entirely similar block diagram. In this embodiment the device 6 comprises: a device 43 for computing a two-dimensional cosine transformation over blocks of size 16×16. The device 43 has an input connected to the input terminal 20 in order to successively receive the brightness values corresponding to a picture block. The two-dimensional transformation is computed in two stages corresponding to two one-dimensional transformations, implementing the known Beyong Gi Lee algorithm. The device 43 can be embodied for example according to the description given in the French Patent Application N°2,581,463.

The encoding device 6 furthermore comprises means enabling the computation in parallel of the transformation coefficients of a block of brightness values and the differences between these values and the transformation coefficients of the similar block in the previous frame. It performs the operations of weighting, quantification and encoding of the sequences of zeroes, in parallel on the coefficients and on the differences of transformation coefficients.

The transformation coefficients computed by the device 43 are successively processed by a weighting device 45, a quantification device 46; and a device for encoding the sequences of zeroes 47. The latter has a first output and a second output respectively supplying encoded data and an indicator indicating the type of data supplied, i.e.: the value of a transformation coefficient or length of a sequence of zeroes. These two outputs are respectively connected to two inputs of a memory 52 intended for storing data and the corresponding indicators, for a block of picture elements encoded according to the intra-image encoding. The memory 52 has two data outputs respectively connected to two inputs $a_1$ and $a_2$ of a multiplexer 51, in order to respectively supply it with a data word and an indicator word.

The device 6 also comprises a subtracter 44 having a first input connected to the output of the device 43 in order to receive the value of a transformation coefficient and having a second input connected to an output of a memory 42 storing the values of the transformation coefficients of the similar block to the one being processed, in the frame encoded immediately previously. The subtracter 44 therefore computes the difference between a transformation coefficient and the similar transformation coefficient in the preceding frame. This difference is then successively processed by a weighting device 48, a quantification device 49, and a device. 50 for encoding sequences of zeroes. The device 50 has two outputs respectively supplying an encoded datum constituted by a difference of transformation coefficients or by a length of a sequence of zeroes, and supplying an indicator corresponding to this type of data.

These two outputs are respectively connected to two data inputs of the block memory 53, intended for storing data and corresponding indicators for a block of picture elements encoded according to the inter-picture encoding. The memory 53 has two data outputs respectively connected, to two inputs $b_1$ and $b_2$ of the multiplexer 51 in order to supply it with a data word and an indicator word respectively, the latter constituting an instruction for controlling the device 10.

The multiplexer 51 has a control input connected to an output of a device 39 for selecting the type of encoding. It also has two outputs respectively connected to the output terminals 23 and 24 of the device 6 in order to respectively supply an instruction and a data word constituted by a transformation coefficient value or a transformation coefficient difference value, or a length of a sequence of zeroes value. Depending on the value of a control signal supplied by the device 39, the multiplexer 51 connects the inputs $a_1$ and $a_2$ respectively to its two outputs or connects the inputs $b_1$ and $b_2$ respectively to its two outputs, depending on whether the encoding to be performed is of the intra-picture type or of the inter-picture type respectively.

The weighting devices 45 and 48, and the quantification devices 46 and 49 have control inputs connected to the input terminal 21 of the device 6 in order for each of them to receive a binary word respectively defining the weighting coefficient and the quantification coefficient applied to the transformation coefficients and to the differences of transformation coefficients of the brightness values. The input terminal 21 is also connected to an input of a device 34 computing the computing the inverse of the weighting coefficient and the inverse of the quantification coefficient.

The device 6 furthermore comprises a device 31 for decoding sequences of zeroes corresponding to the transformation coefficients, this device 31 having two inputs respectively connected to the two outputs of the device 47, and having an output supplying either a non-zero transformation coefficient supplied by the first output of the device 47, or a sequence of zero values, depending on the value of the indicator supplied by the second output of the device 47. The zero or non-zero transformation coefficient values supplied by the device 31 are then successively processed by an inverse quantification device 32 and by an inverse weighting device 33 and are then supplied to a first input of a multiplexer 34.

The device 6 furthermore comprises a device 35 for decoding the sequences of zeroes corresponding to differences of transformation coefficients, having two inputs respectively connected to the first output and to the second output of the device 50 for respectively receiving data, constituted by differences of transformation coefficient or lengths of sequences of zeroes, and indicators indicating the type of these data. The device 35 transmits the non-zero transformation coefficient differences without modifying them, and it supplies a sequence of zero values in order to restore the sequences of zero transformation coefficient differences. These transformation coefficient difference values are supplied by an output of the device 35 and are successively processed by an inverse quantification device 36 and by an inverse weighting device 37 and are then applied to the second input of the multiplexer 34.

The inverse weighting devices 33 and 37, and the inverse quantification devices 32 and 36 have control inputs connected to an output of the device 30 in order to respectively receive the inverse weighting coefficient and the inverse quantification coefficient corresponding to the brightness values of the block being processed, which are computed by the device 30. The multiplexer 34 has an output which is connected either to its first input or to its second input, depending on the value of a binary signal applied to a control input which is connected to the output of the encoding type selection device 39. The output of the multiplexer 34 is connected to a data input of a memory 41 storing the values of the transformation coefficients of all of the blocks of picture elements of the frame having been processed immediately previously.

A data output of the memory 41 is connected to a data input of a memory 42 storing only the transformation coefficients of the block in the previous frame which is similar to the block of picture elements being processed. The memories 41 and 42 have write and read control inputs connected to outputs of the sequencer 11 by links which are not shown. A data output of the memory 42 is connected to the second input of the subtracter 44 in order to supply it with the value of the transformation coefficients of the similar block, in an order corresponding to the order of transformation coefficients computed by the device 43, this order for example being the zigzag order shown in FIG. 1. The memory 42 and the memory 41 act as a digital delay line providing a one-frame delay.

The device 6 furthermore comprises a device 38 for computing the cost of intra-picture encoding and a device 40 for computing the cost of inter-picture encoding, for a same block of picture elements. The device 38 has two inputs respectively connected to the two outputs of the device 47 and has an output connected to an input of the device 39 for selecting the type of encoding. The device 40 has two inputs respectively connected to the two outputs of the encoding device 50 and has an output connected to another input of the device 39. The devices 38 and 40 compute a cost of encoding taking account of the inter-block, intra-block and inter-picture separators; and taking account of the Huffmann code words used for encoding each transformation coefficient, each difference of transformation coefficient, and each sequence of zeroes. The selection device 39 therefore simultaneously receives two binary words indicating the cost of encoding by intra-picture encoding and by inter-picture encoding.

The device 39 determines which is the lowest cost and in principle selects the type of encoding corresponding to this cost. But it can also impose an intra-picture encoding. The device 39 has a first output connected to the control inputs of the multiplexers 34 and 51 in order to control the inter-picture encoding or the intra-picture encoding; and it has a second output connected to the output terminal 22 in order to supply the cost of encoding of the block. This cost is used for computing the filling of the virtual buffer memory.

In order to compare the encoding costs and for imposing the intra-picture encoding in certain cases, the device 39 can be constituted from a microprocessor and a read only memory containing a program corresponding to the implementation of this method.

The method of forcing comprises three criteria. A first criterion consists: in computing the difference between the cost of the intra-picture encoding and the cost of inter-picture encoding; then in dividing this difference by the cost of the inter-picture encoding; then in comparing the result with a first variable threshold value. This first threshold value is computed by counting the number $N(i,j)$ of blocks having the coordinates $(i,j)$ and having been encoded by an inter-picture encoding since the last time that a block of coordinates $(i,j)$ was encoded by an intra-image encoding; then in computing a function of $N(i,j)$, divided by a constant. This function can be $N^2(i,j)$, for example.

A second forcing criterion consists in comparing the number $N(i,j)$ with a second threshold value, $N_o$, which is fixed at 30 for example. The encoding is forced to be an intra-picture encoding when N(i,j) exceeds 30.

A third criterion, intended to stagger the forcing operations in time, consists in only allowing the forcing for blocks whose number, in the frame in question, is equal to a value $N_1$ modulo 4. The value $N_1$ is a whole value varying from 0 to 3 and changing at each frame.

The production of this computing program for a microprocessor is within the capabilities of a person skilled in the art.

Figure 12:
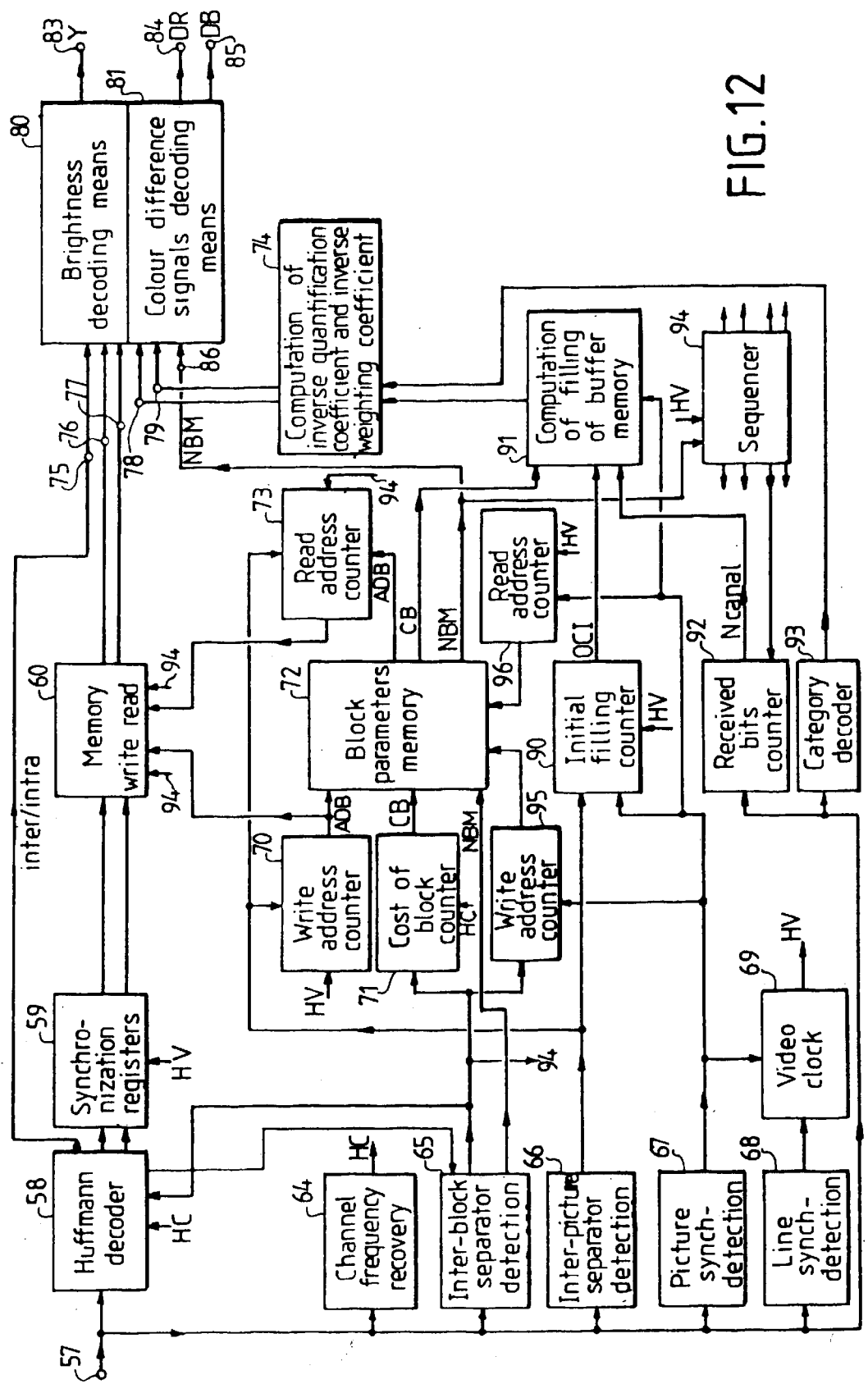
FIGS. 12 and 13 show the block diagram of an embodiment of a decoding device for the implementation of the method according to the invention.

FIG. 12 is the block diagram of an embodiment of a picture decoder for the implementation of the method according to the invention. This example comprises: an input terminal 57 connected to a transmission channel; a Huffmann decoder 58; a set 59 of synchronization registers; a memory 60; means of decoding the brightness 80; means of decoding the color difference signals 81; a device 64 for recovery of the channel frequency; a device 65 for detecting the inter-block separators; a device 66 for detecting the inter-picture separators; a device 67 for detecting the picture synchronization patterns; a device 68 for detecting the line synchronization patterns; a clock 69 at the video signals frequency; a counter 70 of write addresses of the buffer memory; a counter 71 of the cost of a block; a memory 72 for storing the parameters of a block; a counter 73 of read addresses of the buffer memory; a device 74 for computing the inverse quantification coefficient and the inverse weighting coefficient; a counter 90 of the initial fitting; a device 91 for computing the filling of the buffer memory constituted by the memory 60, the decoder 58, and the registers 59; a counter 92 of the number of bits received; a category decoder 93; a sequencer 94; a counter 95 of write addresses of the parameters memory; a counter 96 of the read addresses of the Parameters memory; and three output terminals, 83 to 85, respectively supplying a brightness value Y, a red color difference value DR, and a blue color difference value DB.

The device 67 for detecting the Picture synchronization patterns and the device 68 for detecting the line synchronization patterns have inputs connected to the input terminal 57 and have outputs respectively connected to the two inputs of the clock 69. The clock 69 supplies a clock signal HV which will determine the frequency of the brightness values, and of the color difference values restored by the decoder.

The sequencer 94 supplies control signals to all of the components of the decoding device in synchronism with the video clock signal. For purposes of simplification, this block diagram shows only one type of video clock signal, referenced HV, but there are in fact several video clock signals having frequencies which are sub-multiples of the sampling frequency of the brightness signal. The production of these clock signals is within the capabilities of a person skilled in the art.

The device 64 for recovering the channel frequency has an input connected to the input terminal 57 and has an output supplying a clock signal HC corresponding to the frequency of the bits transmitted on the channel. This clock signal is applied in particular to a clock input of the counter 71 counting the cost of a block in order to count the number of bits corresponding to each block received.

The Huffmann decoder 58 has an input, connected to a transmission channel by the input terminal 57, for receiving a series of binary values at a constant frequency of 10 Mb per second, this series being transmitted by an encoding device such as described previously. It also has a clock input receiving the clock signal NC, and a synchronization input connected to a first output of the inter-block separator detection device 65. The latter supplies a signal which reinitializes the decoder 58 at the start of the transmission of the encoded data of each block. The decoder 58 can only decode a code word corresponding to an event if it has correctly decoded the code word corresponding to the preceding event. In the case of a transmission error, the Huffmann decoder remains unsynchronized until the detection of the next inter-block separator.

The device 65 has an input connected to the input terminal 57 in order to receive the transmitted bits and to (sic) an input connected to an output of the decoder 68 (sic) in order to receive a logic signal each time that the decoder 58 has decoded an event.

The function of the device 65 is to recognize each inter-block separator by means of the pattern constituting the radical, and to check the absence of transmission error by means of the two binary words which follow the radical. For this purpose, it compares the rank of the block, modulo 4, transmitted in the inter-block separator, and the rank of the block counted according to the number of previously received separators. Furthermore the device 65 checks the number of code words received, i.e, the number of events in the previous block, by comparing the transmitted value of the sum of the rank of the block and the number of events, modulo 4, with the sum computed from the number of previously detected blocks and from the number of previously detected events, modulo 4. An inter-block separator is recognized as valid by the device 65 when it is followed by two other inter-block separators checking these two conditions.

When one of these three checks gives a negative result, a second output of the detection device 65 supplies a masking command constituted by a binary word NBM indicating the number of blocks to be masked, to a first input of the memory 72. The association of this error detection and the process of masking incorrect blocks enables incorrect transmissions to be corrected in most cases.

In general, error correcting devices, adapted to the type of channel, are respectively interposed between the output terminal 19 of the encoding device and the input terminal 57 of the decoding device. These devices are conventional and are not shown in the figures. They enable the correction of small packets of errors, by means of a small redundancy of the transmitted bits. The checks performed by the inter-block separator detection device 65 enable the detection of the errors which remain. The latter can be serious for the restored picture because they can falsify not only the brightness or the colors of a block but can affect the position of the whole of the block if an inter-block separator is not recognized. The checking of the rank of each inter-block separator and the checking of the number of decoded events enables a precise computation of the number NBM of blocks to be masked and therefore enables them to be masked and the restoration of an image having a much better quality than if the blocks were restored in inaccurate positions.

The first output of the device 65 is also connected to a zero reset input of the counter 71 for counting the cost of a block; to a clock input of the counter 95 of write addresses of the memory 72; and to an input of the sequencer 94 by means of a link which is not shown.

When an inter-block separator is valid, the binary signal supplied by the first output of the device 65 reinitializes the Huffmann decoder 58, resets to zero the counter 71 counting the cost of a block, increments the counter 95 of write addresses by one unit, and initiates the sequencer 94 such that it commands a writing, in the memory 72, of the parameters of the block which is recognized as valid. The parameters written into the memory 72 are: the address, ADB, of writing the first word of the encoded data of the block, into the memory 60; the cost of this block, CB, i.e. the number of bits between the two inter-block separators enclosing these data; and the value of MBN which is equal to the number of blocks to be possibly masked, this number being zero when there is no block to be masked. These three parameters are respectively supplied by the output of the counter 70 write addresses of the buffer memory; the output of the counter 71 counting the cost of a block; and by the third output of the inter-block separator detection device 65. These three outputs are respectively connected to three data inputs of the memory 72. The latter has a first, second and third data output for respectively restoring the values of these three parameters. It also has read and write control inputs connected to outputs of the sequencer 94 by links which are not shown.

When an inter-block separator is recognized as valid, the sequencer 94 controls a writing into the memory 72 for storing the parameters of the block which follows this separator. The counter 95 of write addresses has an output connected to a write address input of the memory 72 in order to supply it with a write address for the parameters each time that an inter-block separator is validated. When one or more inter-block separators are not recognized as valid, a single set of parameters is written into the memory 72 for the data of several blocks, as everything happens as though the data corresponded to a single block. These data are stored in the buffer memory 60 even if they are incorrect, and they are read from the memory 60, but they are not used for restoring a picture. The counter 95 also has a zero reset input connected to the output of the picture synchronization detection device 67 in order to be reset to zero at the start of each picture.

The output of the counter 70 of write addresses is also connected to a write address input of the buffer memory 60. An input for loading the counter of read addresses, 73, is connected to the first data output of the memory 72 in order to receive a start of block address, ADB; and has an output connected to a read address input of the buffer memory 60. The counter 70 has a clock input receiving the video clock signal HV, and has a zero reset input connected to the output of the device 67. The output of the device 67 is also connected to a zero reset input of the counter 73 of read addresses of the buffer memory. The counter 73 has a clock input connected to an output of the sequencer 94 by a link which is not shown.

The second output of the memory 72 is connected to an input of the device 91 for computing the filling of the buffer memory in order to supply it with the cost of a block, CB. The third output of the memory 72 is connected to an input of the sequencer 94 and to an input terminal 86 of the means 80 and 81 for supplying them with the value of the number of blocks to be masked, NBM.

The Huffmann decoder has a first output and a second output respectively connected to two inputs of registers 59 which are called synchronization registers as they enable the synchronization of the encoded data with the video clock HV, while the Huffmann decoder 58 operates at the channel clock frequency HC. The decoder 58 has a third output supplying an encoding selection binary signal: inter-picture encoding or intra-picture encoding, to an input terminal 75 of the means 80 and 81. Two outputs of the synchronization registers 59 are respectively connected to two data inputs of the buffer memory 60, respectively corresponding to encoded data and to a binary instruction word indicating the type of encoded data. The buffer memory 60 has a first output and a second output respectively connected to input terminals 77 and 76 of the means 80 and 81 in order to supply them respectively with encoded data and a binary instruction word.

The memory 60 also has a write clock input and a read clock input respectively connected to two outputs of the sequencer 94 by links which are not shown. When an inter-block separator has been recognized as valid, the sequencer 94 commands the writing into the memory 60, of the encoded data corresponding to at least one block, at a series of addresses supplied by the counter 70, following the start address of the block ADB, which is the only one stored in the memory 72.

For reading the encoded data stored in the memory 60, the sequencer 94 commands, for each block or group of blocks (if an error has been detected):

a reading, from the memory 72, of the address ADS corresponding to the start of the block;

a loading of this address into the counter of read addresses 73;

a reading at the address ADS, from the buffer memory 60, the address ADS having been supplied to the read address input by the counter 73;

a series of incrementations of the content of the counter 73;

a series of readings, from the buffer memory 60, at addresses supplied by the counter 73.

As the memory 60 is placed downstream of the Huffmann decoder 58, everything occurs as if, instead of the decoder 58 and the memory 60, there were a buffer memory storing in series the binary data transmitted by the channel and restoring them in series. The computing device 91 in fact computes the filling of this buffer memory, which is not related mathematically to the filling of the memory 60 as the latter contains binary words supplied by the Huffmann decoder. The filling of the buffer memory is equal to the quantity of binary information, in the form of Huffmann codes, which remains to be decoded at the instant in question. The capacity of the memory 60 is identical to the capacity of the memory 9 of the encoding device and is sufficient in all cases. In this example it is 32K words, each word being constituted by a datum and an instruction.

The device 74 for computing the quantification coefficient and the weighting coefficient has two outputs respectively connected to input terminals 78 and 79 of the means 80 and 81, and has two inputs respectively connected to an output of the computing device 91 and to an output of the category decoder 93. The computing device 91 has a first input connected to the second data output of the memory 72, supplying a binary word CS which is the cost of encoding a block; a second input connected to an output of the initial filling counter 90, supplying a value OCI; a third input connected to an output of the counter 72, supplying the number of bits received NCANAL; and a fourth input, a zero reset input, connected to an output of the picture synchronization detection device 67.

The initial filling counter, 90, has a clock input receiving the video clock signal HV; a stop input connected to the output the inter-picture separator detection device 66; and a zero reset input connected to the output of the picture synchronization pattern detection device 67. The counter 90 counts the number of bits supplied by the channel to the buffer memory, between the instant at which a picture synchronization pattern is detected and the instant at which an inter-picture separator is detected. The result of this count constitutes the value of the initial filling OCI of the buffer memory, at the start of the each picture.

The counter 92 of the number of received bits has an input connected to the input terminal 57 and an input connected to an output of the sequencer 94. The counter 92 measures the exact number of bits received by the buffer memory since the start of a block, this number not being known in advance in an accurate way as the channel is asynchronous. The counter 92 is reset to zero by a signal supplied by the sequencer 94, in principle at the start of the reception of each block, but the sequencer 94 skips one or more zero resets when the binary word NBM is not zero, i.e. when there is at least one block to be masked. For example, if there are two blocks to be masked, the sequencer 94 only commands a zero reset of the counter 92 at the end of the second masked block.

The category decoder 93 has an input connected to the input terminal 57 for decoding a binary word indicating a category and located just after each inter-block separator. It supplies this binary word to the computing device 74 which takes it into account for computing the quantification coefficient and the inverse weighting coefficient in the same way as the device for computing the quantification and weighting coefficients in the previously described encoding device.

The device 74 for computing the inverse quantification coefficient and the inverse weighting coefficient operate in a similar way to the device 30 computing the quantification coefficient and the weighting coefficient, but in addition it performs the computation of the inverse of the quantification coefficient and the inverse of the weighting coefficient obtained by the formulae (3) to (8).

In these formulae the fitting of the buffer memory of the encoding device is replaced by a value which is equal to a constant less the filling of the buffer memory of the decoding device. In fact, the sum of the filling of these two buffer memories is equal to a constant when the regulation is correctly operating in the encoding device and the decoding device, the consequence of this regulation being that each encoded datum undergoes a constant delay between the time at which it enters into the buffer memory of the encoding device and the time at which it leaves the buffer memory of the decoding device, since the data rate of the channel is constant. This delay corresponds to the constant value of the sum of the two fillings.

This constant is determined by measuring the initial filling OCI of the buffer memory of the decoding device, by means of the initial filling counter 90, which measures the number of bits entering into the device 58 between the time at which the device 67 detects the picture synchronization pattern, which is transmitted independently from the flow of encoded data, and the time at which the device 66 detects the presence of an inter-picture separator in the encoded data arriving at the input of the device 58. The maintenance of the complementary nature of the filling of the two buffer memories enables the inverse quantification coefficient and the inverse weighting coefficient to be computed exactly in the decoder. No information representing the filling of the buffer memory is sent in clear on the transmission channel and consequently this information is not disturbed by the errors.

Figure 13:
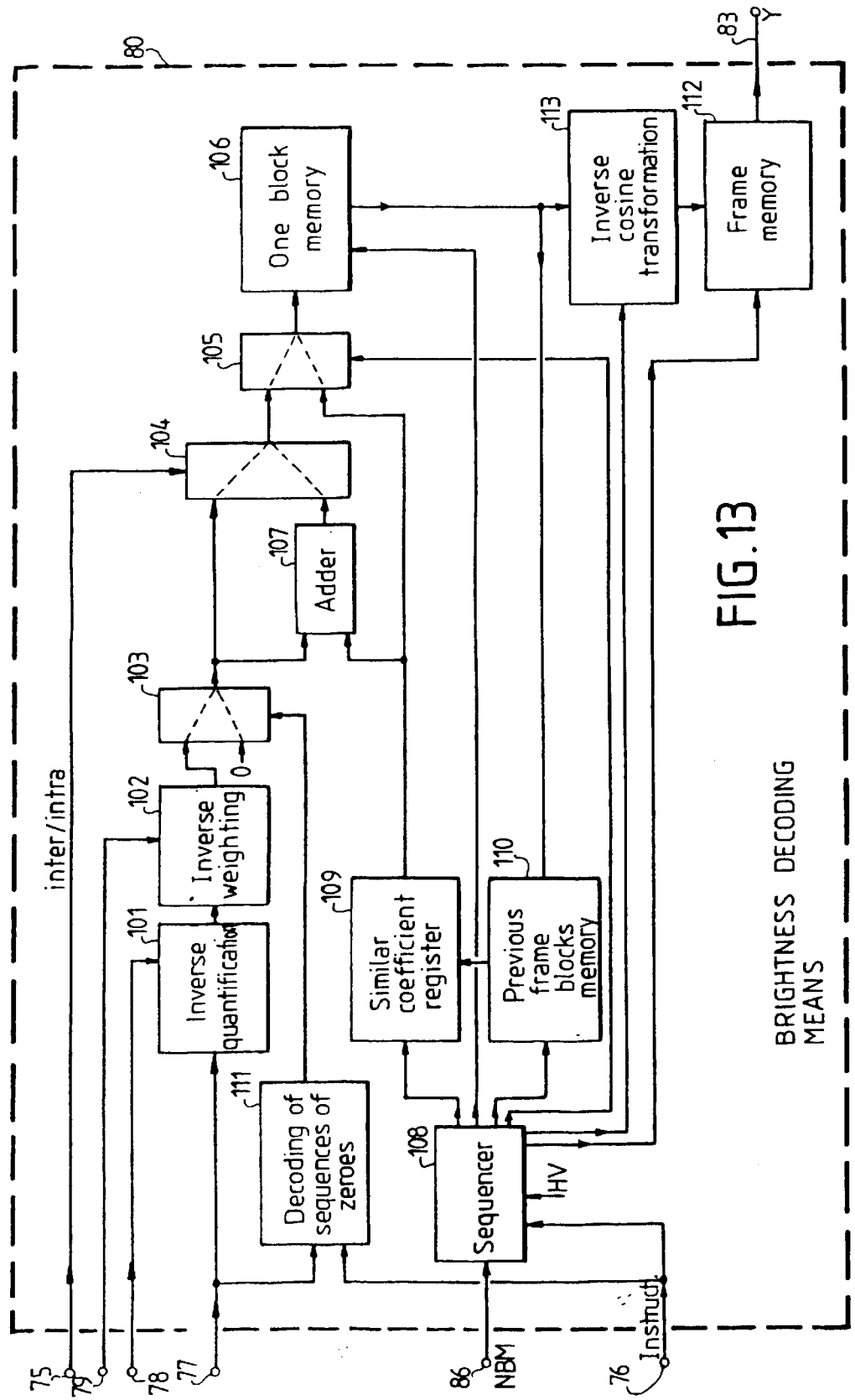

FIG. 13 shows the more detailed block diagram of the brigtness decoding means 80. The means 81 have a similar block diagram and are used alternately for decoding the red color difference signals and blue color difference signals. The means 80 comprise: an inverse quantification device 101; an inverse weighting device 102; three multiplexers 103 to 105, each having two inputs and one output; a memory 106 storing a block of transformation coefficients; an adder 107; a sequencer 108; a register 109 for storing a similar coefficient; a memory 110 for storing the blocks of similar coefficients in the frame preceding the current frame; a device 111 for decoding the sequences of zeroes; a frame memory 112; and a device 113 for computing the two-dimensional inverse cosine transforms.

The device 101 has a data input connected to the input terminal 77 which receives encoded data supplied by the buffer memory 60, and has a control input connected to the input terminal 78 which receives the value of an inverse quantification coefficient computed by the device 74. An output of the device 101 is connected to an input of the device 102. The latter also has an input connected to the input terminal 79 in order to receive the value of an inverse weighting coefficient computed by the device 74, and has an output connected to a first input of the multiplexer 103. The multiplexer 103 has a second input continuously receiving a zero value, and has an output which is connected either to the first input or to the second input depending on the value of a binary signal applied to a control input, connected to an output of the device 111.

The device 111 decodes the sequences of zeroes from the data and from an instruction, applied respectively to a first input and to a second input which are respectively connected to the input terminal 77 and to the input terminal 76 of the means 80. The output of the multiplexer 103 therefore supplies the value of a coefficient or a difference of transformation coefficient. It is connected to a first input of the multiplexer 104 and to a first input of the adder 107. A second input of the adder 107 is connected to an output of the register 109 which supplies it with the value of the transformation coefficient similar to the coefficient being decoded and occurring in the picture preceding the picture being decoded.

The output of the adder 107 therefore supplies the value of a transformation coefficient when its first input receives the value of a difference of transformation coefficient. This output is connected to the second input of the multiplexer 104. The multiplexer 104 has a control input connected to the input terminal 75 in order to receive the value of a control bit selecting an inter-picture decoding or an intra-picture decoding, and it has an output connected to a first input of the multiplexer 105. A second input of the multiplexer 105 is connected to the output of the register 109 in order to receive the value of the coefficient similar to the coefficient being decoded. A control input of the multiplexer 105 is connected to an output of the sequencer 108 in order to possibly receive a masking control signal. When this masking signal is applied to the multiplexer 105, the latter transmits the value of the similar coefficient supplied by the register 109 instead of transmitting the value of the transformation coefficient supplied by the multiplexer 104.

The output of the multiplexer 105 is connected to a data input of the memory 106. The memory 106 has write and read control inputs respectively connected to the outputs of the sequencer 108, the latter commanding the memory 106 to store all the transformation coefficients of a block before commanding the inverse cosine transformation of these coefficients. The sequencer 108 has an input receiving the video clock signal HV, an input connected to the input terminal 76 in order to receive an instruction depending on the type of data to be decoded and an input connected to the input terminal 86 in order to receive the value NBM of the number of blocks to be masked. If NBM=0 the sequencer 108 does not command the masking. If NBM is other than 0, the sequencer 108 commands the masking of the number of indicated blocks.

The memory 110 has a data input connected to a data output of the memory 106 in order to store all of the blocks of transformation coefficients resulting from the decoding of a frame in order to be able to supply the coefficients similar to the transformation coefficients of the following frame. The memory 110 has a data output connected to a data input of the register 109, and has read and write control inputs connected to the outputs of the sequencer 108.

The data output of the memory 106 is also connected to an input of the computing device 113. The latter has a zero reset input connected to an output of the sequencer 108, and has an output connected to a data input of the picture memory 112. The frame memory 112 has a read and write control input connected to outputs of the sequencer 108 and has a data output connected to the output terminal 83 of the decoder, in order to supply a series of brightness values Y. The frame memory 112 has the function of restoring the series of brightness values in the conventional scanning order of a frame while the computing device 113 supplies the decoded brightness values in the order of division of the blocks in the frame. The embodiment of the computing device 113 for performing inverse cosine transformations is conventional. It can be embodied according to the description in the French Patent Application No. 2,581,463.

The scope of the invention is not limited to the examples of embodiment described above and numerous variant embodiments are within the capabilities of a person skilled in the art.

What is claimed is:

1. A method for coding a sequence of pictures comprising the steps of:
    dividing each picture into blocks of picture elements;
    representing each block of picture elements by a luminance block and two chrominance blocks;
    using two kinds of coding in order to reduce the amount of data, an inter coding which takes into account a corresponding block in a previous picture, and intra coding which is independent from a previous picture;
    obtaining a further reduction of data by transmitting high spatial frequencies with less weight than low spatial frequencies by using weighting coefficients accordingly;
    applying the same weighting coefficients to the luminance and the chrominance blocks corresponding to the block of picture elements; and
    varying the weighting coefficients as a function of whether the block of picture elements is inter coded or intra coded.

2. A method according to claim 1, wherein a picture is coded by performing a cosine transform on the luminance and chrominance blocks to provide blocks of coefficients.

3. A method according to claim 2, wherein the weighting coefficients are applied to the transformed blocks of coefficients.

* * * * *